US012634696B2

(12) United States Patent
Brinckman et al.

(10) Patent No.:  US 12,634,696 B2
(45) Date of Patent:     May 19, 2026

(54) DOUBLE BLIND PRIVATE WIRELESS LOCAL AREA NETWORKING

(71) Applicant: Cisco Technology, Inc., San Jose, CA (US)

(72) Inventors: Bart A. Brinckman, Nevele (BE); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 258 days.

(21) Appl. No.: 18/476,749

(22) Filed: Sep. 28, 2023

(65) Prior Publication Data

US 2024/0305985 A1      Sep. 12, 2024

Related U.S. Application Data

(60) Provisional application No. 63/451,162, filed on Mar. 9, 2023.

(51) Int. Cl.
*H04L 9/32*          (2006.01)
*H04L 29/06*       (2006.01)
*H04W 12/06*      (2021.01)
*H04W 12/084*    (2021.01)
*H04W 12/08*      (2021.01)

(52) U.S. Cl.
CPC ......... *H04W 12/084* (2021.01); *H04W 12/06* (2013.01)

(58) Field of Classification Search
CPC ............................ H04W 12/084; H04W 12/06
See application file for complete search history.

(56) References Cited

U.S. PATENT DOCUMENTS

| | | | | |
|---|---|---|---|---|
| 7,529,933 B2 * | 5/2009 | Palekar | ............... | H04L 63/0428 |
| | | | | 713/153 |
| 10,750,366 B1 | 8/2020 | Gundavelli et al. | | |
| 10,880,291 B2 | 12/2020 | Livanos et al. | | |
| 10,911,453 B2 | 2/2021 | Pularikkal et al. | | |
| 10,944,757 B2 | 3/2021 | Brinckman et al. | | |
| 11,283,758 B2 | 3/2022 | Grayson et al. | | |

(Continued)

FOREIGN PATENT DOCUMENTS

| | | | | | |
|---|---|---|---|---|---|
| EP | | 3422630 B1 * | 2/2021 | ......... | H04L 63/0838 |
| WO | WO-2013151752 A1 * | | 10/2013 | ......... | H04L 63/0815 |
| WO | | 2022090813 A1 | 5/2022 | | |

OTHER PUBLICATIONS

Maneesh Upmanyu, Anoop M. Namboodiri, Kannan Srinathan, and C. V. Jawahar; "Blind Authentication: A Secure Crypto-Biometric Verification Protocol"; IEEE Transactions on Information Forensics and Security, vol. 5, No. 2, Jun. 2010; pp. 255-268 (Year: 2010).*

(Continued)

*Primary Examiner* — Fatoumata Traore
*Assistant Examiner* — Courtney D Fields
(74) *Attorney, Agent, or Firm* — Edell, Shapiro & Finnan, LLC

(57) ABSTRACT

Techniques are provided for double blind private Wi-Fi wireless networking using an authentication method (e.g., OpenRoaming) that allows the network to authenticate a user identity against an IDP (e.g. Apple ID), without disclosing any identifiable information about that user to the network, or any information about that user's location or behavior to the identity provider, by leveraging a double-blind method.

32 Claims, 16 Drawing Sheets

(56)        References Cited

U.S. PATENT DOCUMENTS

| | | | |
|---|---|---|---|
| 11,438,824 B2 | 9/2022 | Grayson et al. | |
| 2014/0237247 A1* | 8/2014 | Winget | H04L 63/1458 |
| | | | 713/171 |
| 2015/0067813 A1 | 3/2015 | Cha et al. | |
| 2021/0058391 A1 | 2/2021 | Graybeal et al. | |
| 2021/0314293 A1* | 10/2021 | Soundararajan | H04L 63/10 |
| 2022/0030423 A1 | 1/2022 | Sicard et al. | |
| 2022/0167160 A1 | 5/2022 | Grayson et al. | |
| 2022/0311626 A1 | 9/2022 | Gundavelli et al. | |
| 2022/0321556 A1 | 10/2022 | Gandhi et al. | |
| 2023/0021642 A1 | 1/2023 | Grayson et al. | |
| 2023/0056374 A1 | 2/2023 | Brinckman et al. | |

OTHER PUBLICATIONS

Davidson A., et al., "The Privacy Pass Architecture draft-ietf-privacypass-architecture-11", Privacypass, Internet Engineering Task Force, Letf, Standardworkingdraft, Internet SOC, No. 11, Mar. 6, 2023, 25 Pages, XP015158206, https://datatracker.ietf.org/doc/draft-ietf-privacypass-architecture/11/.

International Search Report and Written Opinion for International Application No. PCT/US2024/017941, mailed Jun. 17, 2024, 18 Pages.

* cited by examiner

800

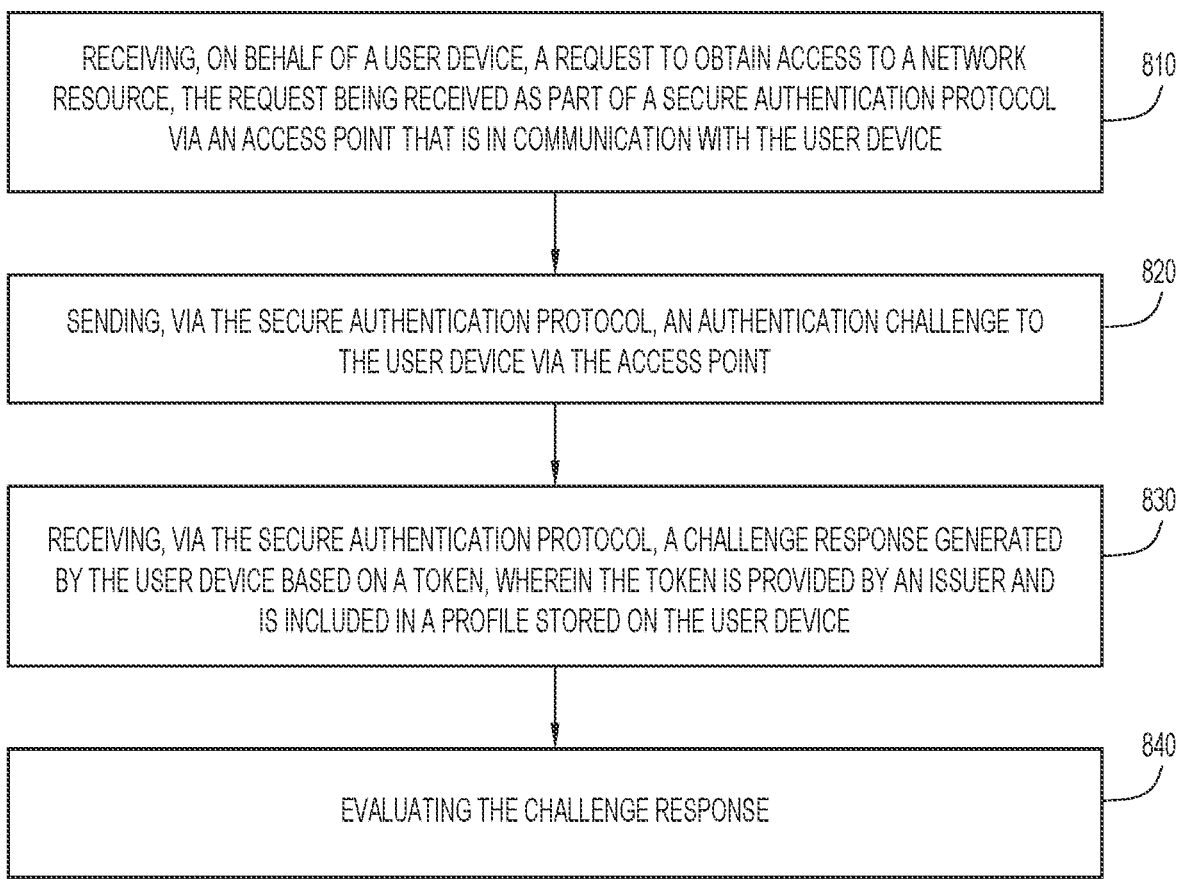

RECEIVING, ON BEHALF OF A USER DEVICE, A REQUEST TO OBTAIN ACCESS TO A NETWORK RESOURCE, THE REQUEST BEING RECEIVED AS PART OF A SECURE AUTHENTICATION PROTOCOL VIA AN ACCESS POINT THAT IS IN COMMUNICATION WITH THE USER DEVICE          810

SENDING, VIA THE SECURE AUTHENTICATION PROTOCOL, AN AUTHENTICATION CHALLENGE TO THE USER DEVICE VIA THE ACCESS POINT          820

RECEIVING, VIA THE SECURE AUTHENTICATION PROTOCOL, A CHALLENGE RESPONSE GENERATED BY THE USER DEVICE BASED ON A TOKEN, WHEREIN THE TOKEN IS PROVIDED BY AN ISSUER AND IS INCLUDED IN A PROFILE STORED ON THE USER DEVICE          830

EVALUATING THE CHALLENGE RESPONSE          840

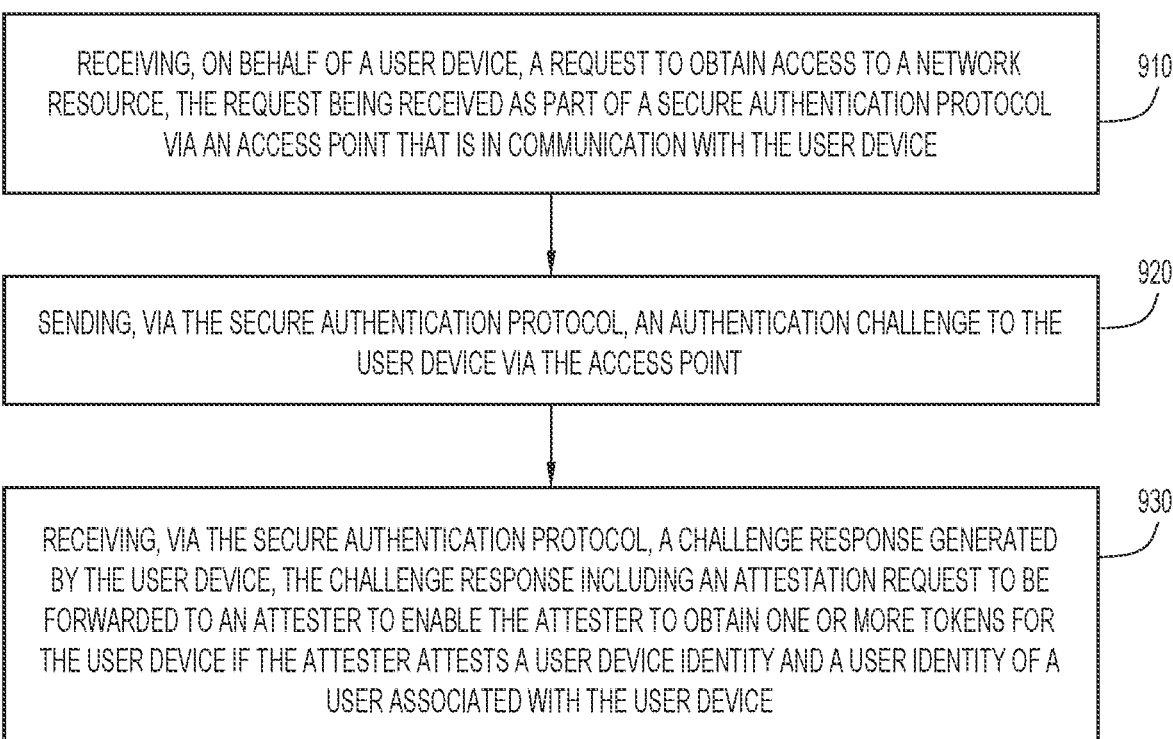

RECEIVING, ON BEHALF OF A USER DEVICE, A REQUEST TO OBTAIN ACCESS TO A NETWORK RESOURCE, THE REQUEST BEING RECEIVED AS PART OF A SECURE AUTHENTICATION PROTOCOL VIA AN ACCESS POINT THAT IS IN COMMUNICATION WITH THE USER DEVICE          910

SENDING, VIA THE SECURE AUTHENTICATION PROTOCOL, AN AUTHENTICATION CHALLENGE TO THE USER DEVICE VIA THE ACCESS POINT          920

RECEIVING, VIA THE SECURE AUTHENTICATION PROTOCOL, A CHALLENGE RESPONSE GENERATED BY THE USER DEVICE, THE CHALLENGE RESPONSE INCLUDING AN ATTESTATION REQUEST TO BE FORWARDED TO AN ATTESTER TO ENABLE THE ATTESTER TO OBTAIN ONE OR MORE TOKENS FOR THE USER DEVICE IF THE ATTESTER ATTESTS A USER DEVICE IDENTITY AND A USER IDENTITY OF A USER ASSOCIATED WITH THE USER DEVICE          930

FIG.9

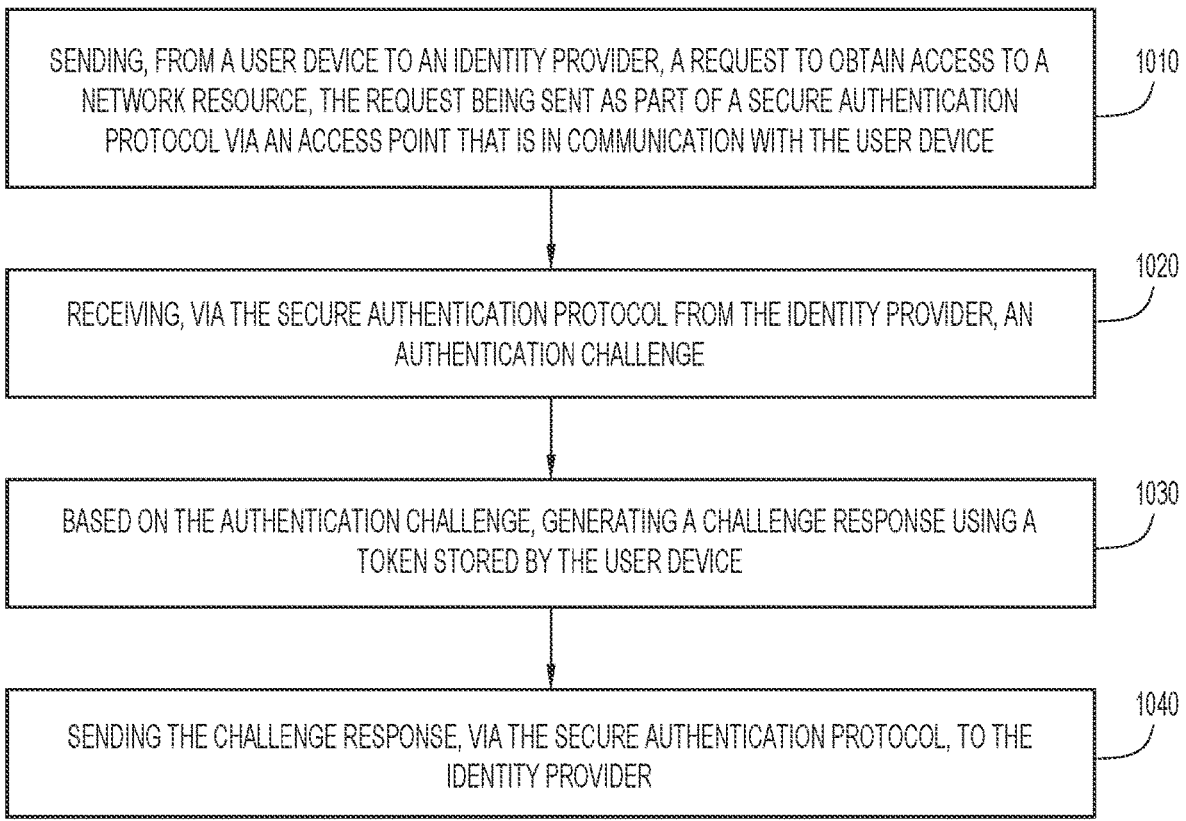

1000

SENDING, FROM A USER DEVICE TO AN IDENTITY PROVIDER, A REQUEST TO OBTAIN ACCESS TO A NETWORK RESOURCE, THE REQUEST BEING SENT AS PART OF A SECURE AUTHENTICATION PROTOCOL VIA AN ACCESS POINT THAT IS IN COMMUNICATION WITH THE USER DEVICE 1010

RECEIVING, VIA THE SECURE AUTHENTICATION PROTOCOL FROM THE IDENTITY PROVIDER, AN AUTHENTICATION CHALLENGE 1020

BASED ON THE AUTHENTICATION CHALLENGE, GENERATING A CHALLENGE RESPONSE USING A TOKEN STORED BY THE USER DEVICE 1030

SENDING THE CHALLENGE RESPONSE, VIA THE SECURE AUTHENTICATION PROTOCOL, TO THE IDENTITY PROVIDER 1040

FIG.10

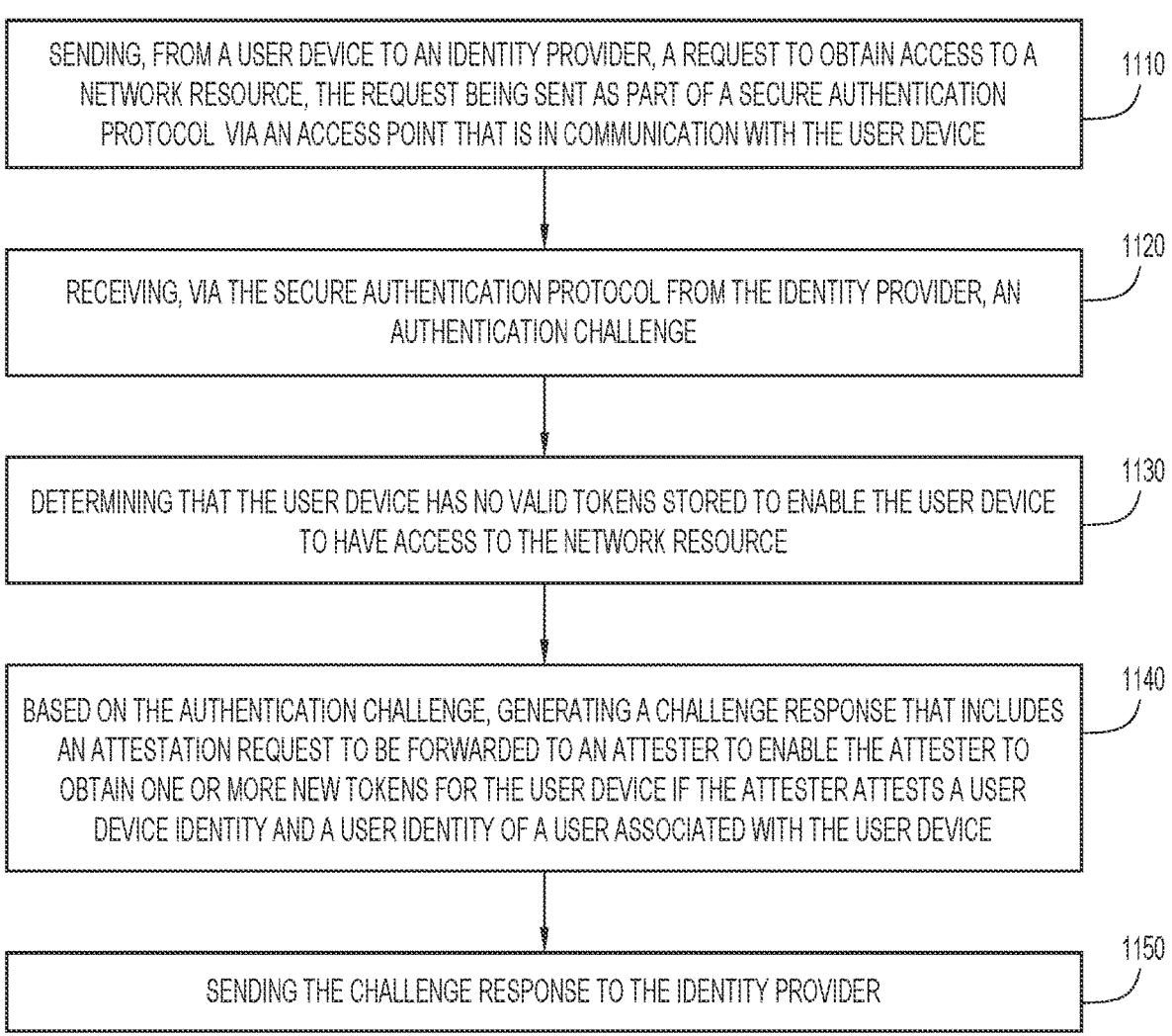

1100

SENDING, FROM A USER DEVICE TO AN IDENTITY PROVIDER, A REQUEST TO OBTAIN ACCESS TO A NETWORK RESOURCE, THE REQUEST BEING SENT AS PART OF A SECURE AUTHENTICATION PROTOCOL VIA AN ACCESS POINT THAT IS IN COMMUNICATION WITH THE USER DEVICE — 1110

RECEIVING, VIA THE SECURE AUTHENTICATION PROTOCOL FROM THE IDENTITY PROVIDER, AN AUTHENTICATION CHALLENGE — 1120

DETERMINING THAT THE USER DEVICE HAS NO VALID TOKENS STORED TO ENABLE THE USER DEVICE TO HAVE ACCESS TO THE NETWORK RESOURCE — 1130

BASED ON THE AUTHENTICATION CHALLENGE, GENERATING A CHALLENGE RESPONSE THAT INCLUDES AN ATTESTATION REQUEST TO BE FORWARDED TO AN ATTESTER TO ENABLE THE ATTESTER TO OBTAIN ONE OR MORE NEW TOKENS FOR THE USER DEVICE IF THE ATTESTER ATTESTS A USER DEVICE IDENTITY AND A USER IDENTITY OF A USER ASSOCIATED WITH THE USER DEVICE — 1140

SENDING THE CHALLENGE RESPONSE TO THE IDENTITY PROVIDER — 1150

FIG.11

DOUBLE BLIND PRIVATE WIRELESS LOCAL AREA NETWORKING

CROSS REFERENCE TO RELATED APPLICATION

This application claims priority to U.S. Provisional Application No. 63/451,162, filed Mar. 9, 2023, the entirety of which is incorporated herein by reference.

TECHNICAL FIELD

The present disclosure relates to wireless local area networking.

BACKGROUND

When a user device authenticates to a wireless local area network that employs Wi-Fi® wireless communication technology, the wireless network can learn something about the user of that user device, ranging from its identity, what type of identity the user is using, etc. This can be combined with behavioral data to profile that user. If the user is authenticated by an identity provider (IDP), the IDP can also learn information about that user, such as the location of the user, how long the user was at that location, and the volume of traffic associated with the user.

BRIEF DESCRIPTION OF THE DRAWINGS

FIG. 8 is a flow chart depicting operations performed by an identity provider during attempted redemption by a user device, according to an example embodiment.

FIG. 9 is a flow chart depicting operations performed by an identity provider during in-band issuance, according to an example embodiment.

FIG. 10 is a flow chart depicting operations performed by a user device during attempted redemption, according to an example embodiment.

FIG. 11 is a flow chart depicting operations performed by a user device during in-band issuance, according to an example embodiment.

DESCRIPTION OF EXAMPLE EMBODIMENTS

Overview

Figure 1:
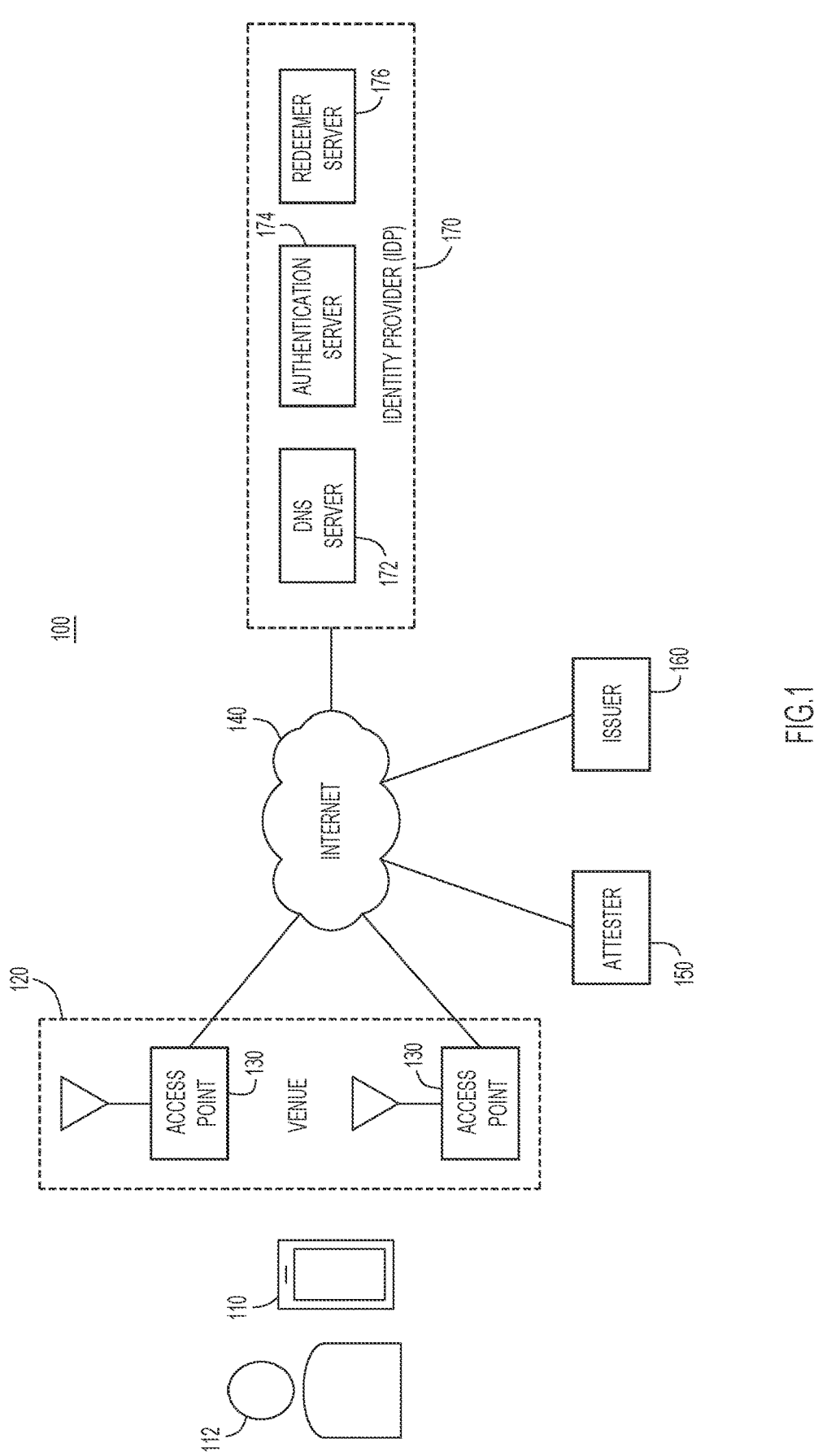
FIG. 1 is a block diagram of a system in which a user device is permitted to access a network resource using a double blind authentication method, according to an example embodiment.

Presented herein are techniques to provide a double blind authentication method that allows a user to securely authenticate to obtain access to a network resource, such as a Wi-Fi wireless network, without divulging any personal information to either the network or to the identity provider.

In one form, a method is provided for attempting to redeem a challenge response generated by a user device using a token previously provided to the user device. The method includes: receiving, on behalf of a user device, a request to obtain access to a network resource, the request being received as part of a secure authentication protocol via an access point that is in communication with the user device; sending, via the secure authentication protocol, an authentication challenge to the user device via the access point; receiving, via the secure authentication protocol, a challenge response generated by the user device based on a token, wherein the token is provided by an issuer and is included in a profile stored on the user device; and evaluating the challenge response.

In another form, a method is provided to remediate a situation where a user device does not have any valid tokens to respond to an authentication challenge in order to obtain access to a network resource. The method includes: receiving, on behalf of a user device, a request to obtain access to a network resource, the request being received as part of a secure authentication protocol via an access point that is in communication with the user device; sending, via the secure authentication protocol, an authentication challenge to the user device via the access point; and receiving, via the secure authentication protocol, a challenge response generated by the user device, the challenge response including an attestation request to be forwarded to an attester to enable the attester to obtain one or more tokens for the user device if the attester attests a user device identity and a user identity of a user associated with the user device.

In yet another form, a method is provided by which a user device seeks to obtain access to a network resource. The method includes: sending, from a user device to an identity provider, a request to obtain access to a network resource, the request being sent as part of a secure authentication protocol via an access point that is in communication with the user device; receiving, via the secure authentication protocol from the identity provider, an authentication challenge; based on the authentication challenge, generating a challenge response using a token stored by the user device; and sending the challenge response, via the secure authentication protocol, to the identity provider.

In still another embodiment, a method is provided by which a user device seeks to remediate a situation in which the user device does not have any valid tokens to obtain access to a network resource. The method includes: sending, from a user device to an identity provider, a request to obtain access to a network resource, the request being sent as part of a secure authentication protocol via an access point that is in communication with the user device; receiving, via the secure authentication protocol from the identity provider, an authentication challenge; determining that the user device has no valid tokens stored to enable the user device to have access to the network resource; based on the authentication challenge, generating a challenge response that includes an attestation request to be forwarded to an attester to enable the attester to obtain one or more new tokens for the user device if the attester attests a user device identity and a user identity of a user associated with the user device; and sending the challenge response to the identity provider.

EXAMPLE EMBODIMENTS

Referring first to FIG. 1, a block diagram is shown of a system 100 that enables a user device 110 to obtain network connectivity, e.g., wireless network connectivity, at a venue 120 that may include one or more wireless access points (APs) 130. There is a user 112 associated with the user device 110. The APs 130 have connectivity to the Internet 140 through one or more local area networks (not shown in FIG. 1 for simplicity). The APs 130 may enable wireless network connectivity, such as Wi-Fi wireless local area network connectivity. Another term for the user device 110 is a client or client device. The user device 110 may be a smartphone, tablet computer, laptop computer, or any device now known or hereinafter developed that has wireless and/or wired network connection capabilities.

The system 100 includes an Attester 150 and an Issuer 160. The Attester 150 includes one or more servers that are used to attest to the user identity and user device identity. That is, the Attester 150 attests that the user has an account with a service that is in good standing and that the user device is a real/valid user device to which the user is logged in. The Attester 150 will request one or more tokens from the Issuer 160 if the attestation is successful, and return the one or more tokens to the user device 110.

The Issuer 160 may include one or more servers that issue tokens to the Attester 150 when the Attester 150 provides proof of attestation.

The user device 110, in which the user 112 is logged in with a user identifier may request attestation for the user 112 from the Attester 150. After issuance, the user device 110 will install a network profile (sometimes referred to as a "hotspot" profile) on the device with credentials that point to the token(s) provided by the Issuer 160. Further aspects of the network profile are described below.

The system 100 further includes an Identity Provider (IDP) 170. In one example, the IDP 170 includes an IDP Domain Name System (DNS) server 172, an Authentication Server 174 and a Redeeming Server 176. The Authentication Server 174 may be configured to use one or more various authentication protocols, such as the Extensible Authentication Protocol (EAP), a tunneling based authentication protocol such as EAP-Flexible Authentication via Secure Tunneling (EAP-FAST), or the Tunnel Extensible Authentication Protocol (TEAP), for example. FIG. 1 shows that the DNS server 172, Authentication Server 174 and Redeeming Server 176 are associated with a given IDP 170, but that is only an example, as they could be entities independent and separate from the IDP 170.

The Authentication Server 174 may be configured to participate in a trusted authentication federation that provides a platform for device authentication across numerous access network providers. The APs 130 at the venue 120 may be configured to participate in this trusted authentication federation. One example of a trusted authentication federation is the OpenRoaming™ technology of the Wireless Broadband Alliance. This trust, based on such a federation, allows an access network provider to authenticate and authorize device access to a visited network that is operated by another/different access network provider. In the case where the OpenRoaming technology is employed, the Authentication Server 174 may serve as an OpenRoaming IDP.

The Redeeming Server 176 may be any access network provider that supports private wireless network connectivity. The Redeeming Server 176 redeems a token from a user device in order to permit/allow network connectivity for a user and user device at the venue 120 based on the validity of the token, as described further below.

Techniques are presented to authenticate a user identity against an IDP without disclosing any identifiable information about that user to the network (e.g., to the APs 130 and other network devices associated with the venue 120), or any information about that user's location or behavior to the identity provider (IDP 170). These techniques are thus referred to as a "double blind" authentication method.

A trusted authentication platform, such as OpenRoaming, may leverage a capability of wireless networks called Wi-Fi CERTIFIED Passpoint, which is an industry standard that facilitates access to Wi-Fi hotspots without users having to authenticate to the network each time access is desired. When a user device discovers a wireless network identifier (e.g., a service set identifier (SSID)) broadcast by an AP that is "Passpoint" enabled, the user device is authenticated through an IDP by sending an initial request with a name that is anonymous at the IDP realm that the user is trying to authenticate against. The local security proxy sees that the user is trying to authenticate at a particular realm and will redirect the query to the authentication server that is registered for that realm. A dialogue ensues from that AP directly to the realm, where some authentication occurs and eventually a communication goes back to the security proxy indicating that the user is valid.

The venue may ask the IDP for the identity of the user (who was it) and then a two-way mechanism is performed that either indicates who the user was, or the venue may indicate that it does not want to know who the user was, but to keep track of who the user is in case there was a problem.

The techniques presented herein are useful when privacy is to be maintained about who the user is that is seeking network access and where the user is located when seeking access. Thus, privacy is maintained as to the identity of the user and the location of the user. With the use of these techniques, no entity can determine who is connecting to the network. The IDP 170 does not know who the user is and the venue 120 also does not know who the user is. There is no direct connection to the IDP.

The techniques presented herein involve 2 phases:

Issuance phase: During this phase, the Issuer 160 issues one or more tokens for a user device that attests to user identity and device identity. The Issuer issues such token(s) for an attestation (of user identity and user device identity) provided by an entity that can attest to the assertions, i.e., the Attester 150.

Redeeming/Redemption phase: When the user device 110 wants to consume a service or access a network resource (e.g., obtain network access at venue 120), the user device will leverage a token from the Issuer to respond to a challenge, proving the previously made attestation. This token can be authenticated by a third party (the Redeeming Server 176) without exposing to the Attester 150 the location of the user or the service consumed by the user device 110.

The relationship between the Issuer and Redeemer (Redeeming Server) can be public or private. As an example, if the relationship is private, then the Issuer can exchange keying material with the Redeemer. If the relationship is public, the Issuer may just publicly post the keying material for any Redeemer to use. There may be other arrangements now known or hereinafter developed that may be used with respect to the relationship between the Issuer and Redeemer.

Figure 2:
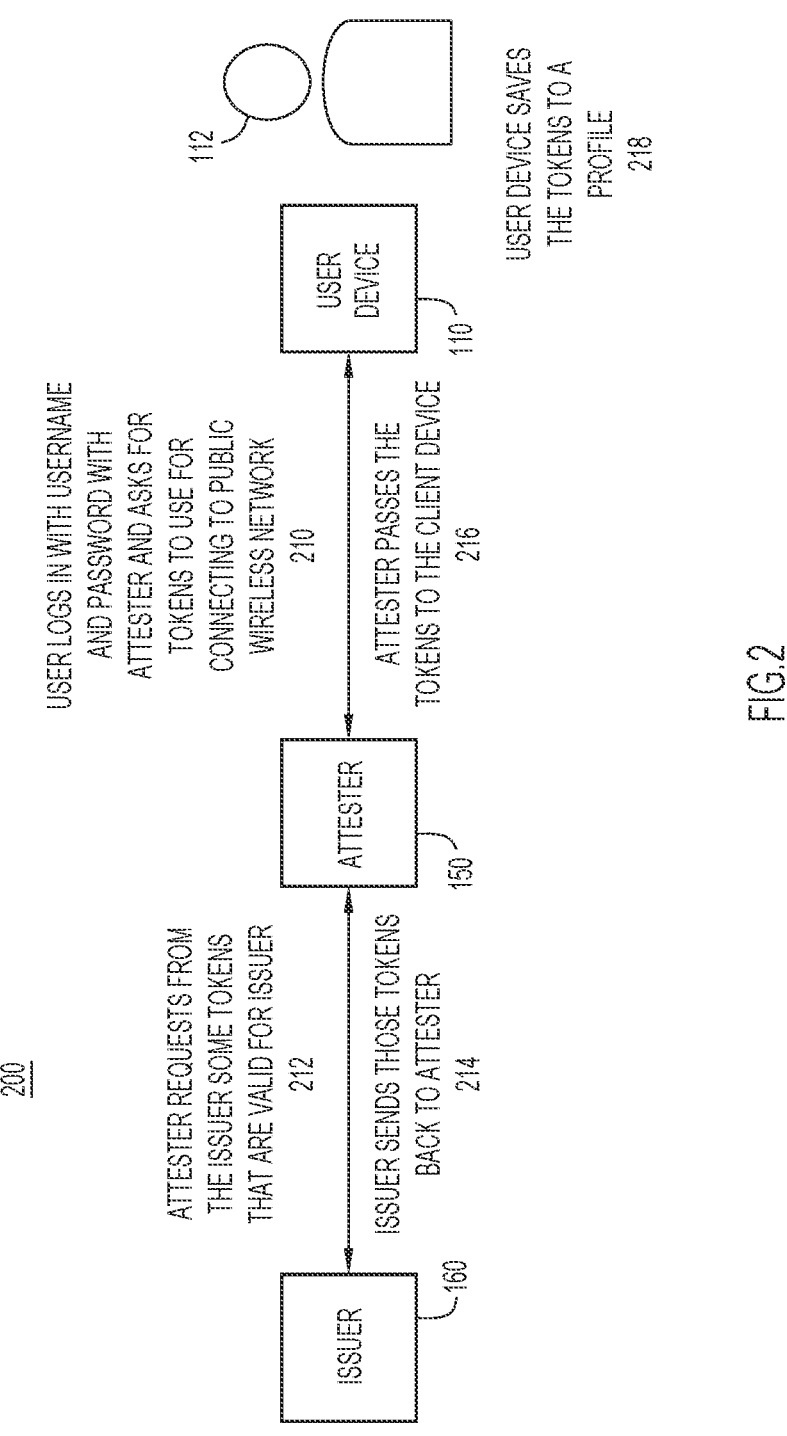
FIG. 2 is a flow diagram depicting a process for issuing tokens to a user device, according to an example embodiment.

The Issuance phase is now described with reference to FIG. 2. The Issuance phase, shown at reference numeral 200, involves interactions between user device 110 and Attester 150, and between the Attester 150 and Issuer 160. There are no direct interactions between the Issuer 160 and the user device 110. At 210, the user 112 of user device 110 logs in with a username and password with the Attester 150, and requests one or more tokens to use for later obtaining access to some services or network resources, such as to connect to public Wi-Fi wireless network access. The Attester 150 attests to the user identity and device identity (e.g., the user's account is in good standing and the user device is a real/authentic device to which the user is logged in).

Assuming attestation is successful, at 212, the Attester 150 sends a request to the Issuer 160 for one or more tokens. There is no information contained in the request sent to the Issuer 160 about the user device 110 or the user 112. The Issuer has no knowledge of the user device or user for which the Attester 150 is requesting tokens. The Issuer 160 only knows that there is a valid user to which the Attester 150 has attested (and has provided proof of attestation) and it delivers the token(s) based on the user successfully attesting with Attester 150. Again, the Issuer 160 knows that Attester 150 requested tokens but does not know anything about the user or the user device that for which the tokens are provided.

At 214, the Issuer sends the one or more (one-time) tokens to the Attester and at 216 the Attester passes the one or more tokens to the user device 110. In one variation, the Attester 150 does not even observe and/or store the tokens, it just passes them on to the user device 110. In a variation to this, the Issuer 160 may send the tokens to another entity (an entity other than the Attester 150) and that other entity sends the tokens to the user device 110. This variation would completely hide the tokens from the Attester 150.

At 218, the user device 110 saves the tokens to a profile (e.g., a network access profile such as a "hotspot" profile). The profile will include credentials that point to the token(s) provided by the Issuer 160. The tokens may be one-time use tokens that have a lifetime that is determined by the Issuer, such as months, days, etc., but once used, the one-time tokens enable sustained access to the network resource. These one-time tokens are to be contrasted with a remediation token that permits access for a short-lived session, as described below. A token is an encrypted (or unencrypted) data object (string) that is used at the time of redemption to determine whether the user may access a resource. The token may appear to be a random string, but the structure of the token may be specific. For example, the token may take on the form/structure according to Section 6.1 of https://www.ietf.org/archive/id/draft-ietf-privacypass-protocol-04.html#name-client-to-issuer-request-2, or take the form of:

```
struct {
    uint16_t token_type;
```

-continued

```
    uint8_t nonce[32];
    uint8_t challenge_digest[32];
    uint8_t token_key_id[Nid];
    uint8_t authenticator[Nk];
} Token;
```

Figure 3:
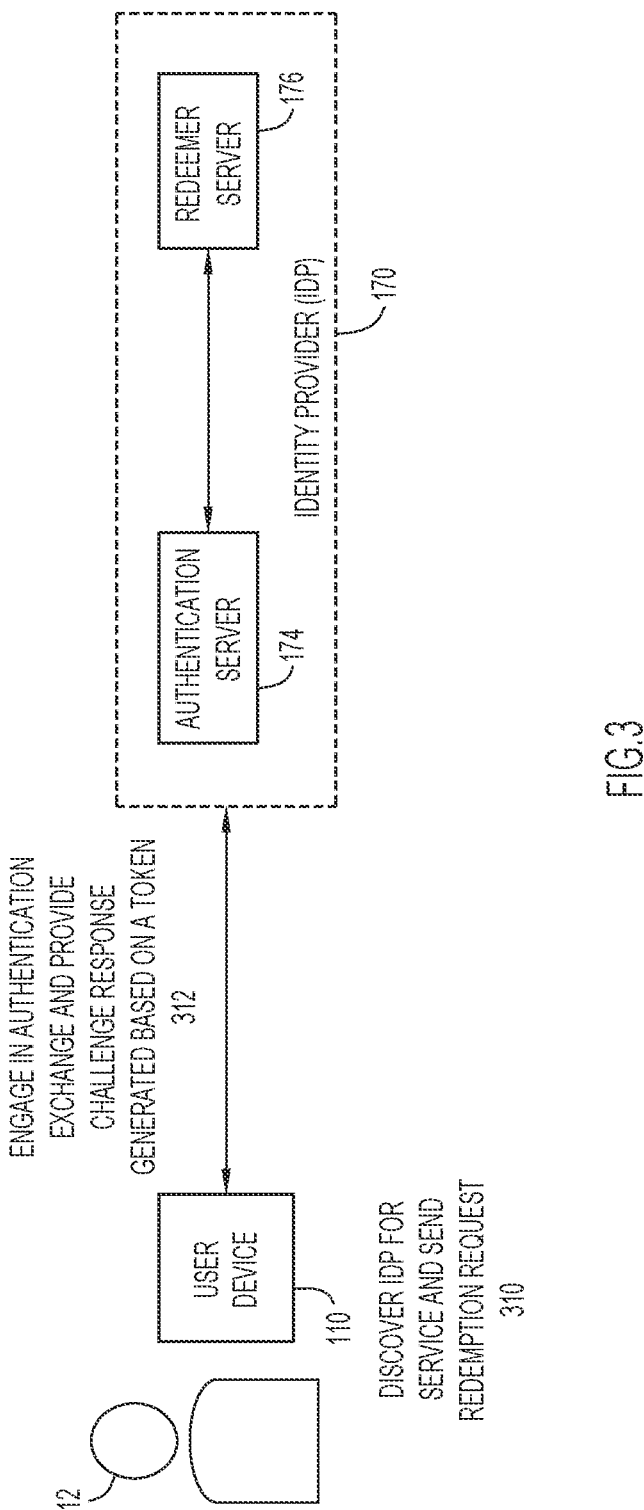
FIG. 3 is a flow diagram depicting a process for redeeming tokens supplied by a user device to an identity provider, according to an example embodiment.

Reference is now made to FIG. 3 for a description of the Redeeming/Redemption phase 300. As explained above, when the user 112 of a user device 110 wants to consume a service (e.g., obtain network access at venue 120), the user device 110 will leverage a token obtained (indirectly) from the Issuer to respond to a challenge from the Authentication Server 174, thereby proving the previously made attestation. This token can be authenticated by a third party (the Redeeming Server 176) without exposing to the Attester 150 to information about the location of the user or the service consumed by the user device 110. At 310, the user device 110, to which user 112 is logged in with a valid user identity, discovers the IDP for the service it is seeking to obtain (the Redeeming Server). This may be facilitated by the trusted federation established beforehand, i.e., the OpenRoaming trusted authentication federation. At 312, the user device engages in an authentication exchange (e.g., EAP-FAST, TEAP or some other secure tunneling authentication protocol now known or hereinafter developed) with the IDP 170, and uses a token to generate a challenge response to a challenge provided by the IDP 170. The authentication server 174 terminates the authentication exchange for the IDP and thus may serve as the IDP, e.g., trusted federation (OpenRoaming) IDP, for the session.

The user device 110 leverages a previously obtained token to respond to the challenge from the Redeeming Server 176. The token itself is not sent in the challenge response but is used in order to generate the challenge response. The Authentication Server 174 uses a public key of the Issuer (which the Issuer publishes/provides to IDPs, such as IDPs that participate in the trusted authentication federation, including IDP 170) and verifies that the token was effectively signed by the Issuer (the challenge response provided by the user device 110 was based on a valid token), and if so, then it continues the authentication conversation and sends an access accept to let the user device have access to the resource/service, such as to join the wireless network at a venue. The Attester 150 is not part of the redemption phase and thus does not know that the user device is connecting to a resource.

The Authentication Server 174 can retrieve the public key of the Issuer 160 at any time, such as for the first authentication, and then it may cache it for subsequent use. The Authentication Server 174 may do this for multiple different Issuers. The Authentication Server 174 may not retrieve the public key every time it is pinged if it has already cached it for a given Issuer. Thus, in this method, the Issuer 160 does not know whether or not a user or which user is seeking access because the Issuer 160 never sees (has access to) the submitted token as part of the redemption phase. The Issuer 160 merely knows that some entity (Redeeming Server 176) is asking if the token is valid (and only in an indirect manner) and does not know where and which user device is asking for redemption in order to access a network resource. In other words, the Issuer 160 just knows that an entity (e.g., the Authentication Server 174) retrieved its public key. Consequently, when a user connects to a venue, the venue does not know who the user is because the venue resources do not see the user's request to the Attester 150. The venue resources merely know that the user device 110 is using a token to respond to a challenge response from the Redeeming Server. Again, the Attester 150 does not know where the user device is using the tokens. The Issuer 160 merely knows that it issued tokens for the Attester 150 at some time in the past, but it did that for many other users and the Issuer 160 does not know where the tokens are used.

Aspects and variations of the Issuance and Redemption phases are described below with respect to more detailed sequence diagrams/call flows of FIGS. 4-6, 7A and 7B. There are several ways that Issuance may occur: out-of-band issuance, in-band issuance, and out-of-band issuance with in-band remediation.

Figure 4:
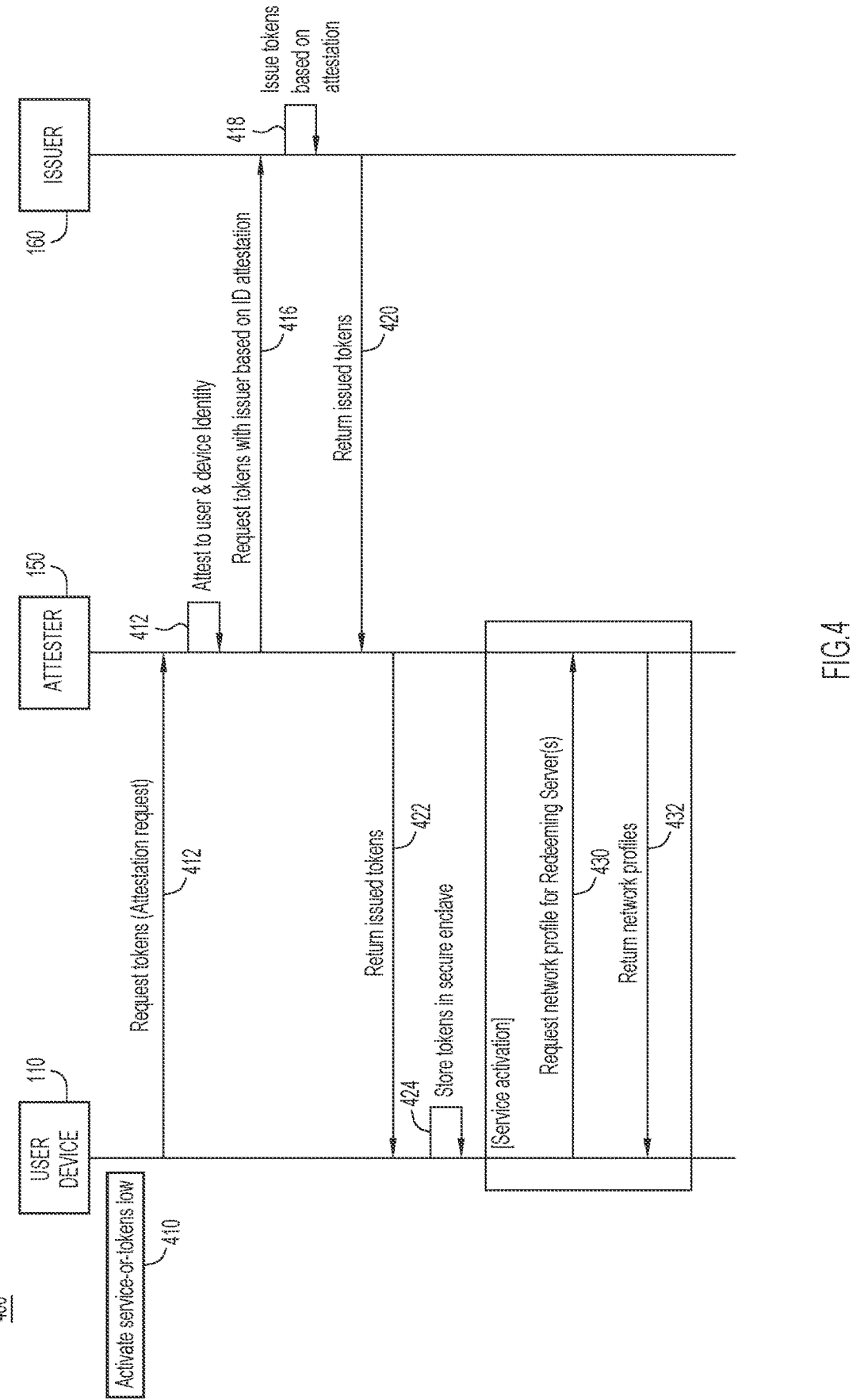
FIG. 4 is a sequence diagram depicting an out-of-band issuance process by which a user device may obtain tokens from an issuer, according to an example embodiment.

Referring now to FIG. 4, a sequence diagram for an out-of-band issuance process 400 is now described. The user device 110 is issued a number of tokens when signing up to a service and stores those tokens locally. The user device is responsible for refreshing these tokens out-of-band, so they can be used upon authentication and redemption. The term "out-of-band" refers to an exchange that occurs separately from when the user device is seeking access to the resource, e.g., network connectivity. For example, a user unboxes the user device for the first time and connects to home Wi-Fi or other known wireless network. This out-of-band issuance process 400 may be performed each time the user device connects on a daily basis, and it may determine that it has some tokens that have expired or are about to expire, and it needs to obtain some new tokens.

At 410, the user device 110 is seeking to activate a service or determines that it is running low of unexpired/valid tokens. At 412, the user device sends to the Attester 150 a request for one or more tokens from the Attester 150 as part of an attestation request. At 414, the Attester 150 verifies that the user identity and user device identity are in good standing. Assuming attestation is successful, then at 416, the Attester 150 requests one or more tokens (with a specified or requested lifetime x) from the Issuer 160. At 418, the Issuer 160 confirms the attestation and generates one or more tokens. At 420, the Issuer 160 returns the requested one or more tokens to the Attester 150. At 422, the Attester 150 returns the requested tokens to the user device 110. At 424, the user device 110 stores the tokens, such as in its secure enclave.

If the service is yet to be activated, at 430, the user device 110 will request a network profile (e.g., a hotspot profile) for the Redeeming Server or a pool of Redeeming Servers supported by the Issuer 160. At 432, the Attester 150 returns the network profile (e.g., hotspot profile), such as with trusted authentication federation identification information, for example, Wireless Broadband Alliance (WBA) Roaming Consortium Organization Identifier (RCOI) and an anonymous identity with IDP redeemer realm (anonymous@redeemer.com). In case the EAP-FAST or TEAP TLS session is authenticated, a certificate signed by a device trusted certificate authority (CA) server (EAP server certificate) or a trusted name of a certificate from a CA may be already present in the device trusted data store.

Figure 5A:
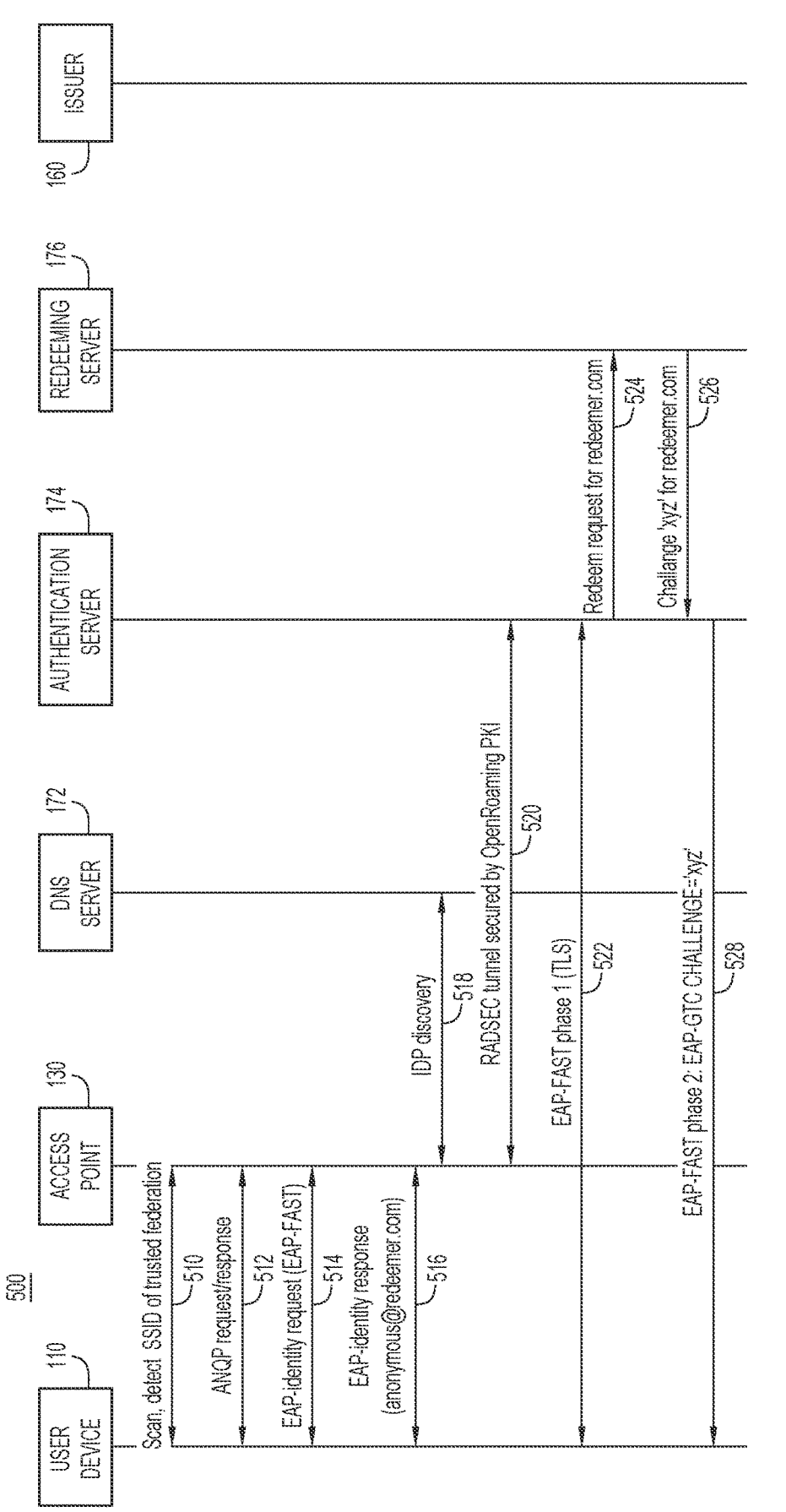
FIGS. 5A and 5B illustrate a sequence diagram depicting a redemption process by which a user device may redeem tokens in order to obtain access to a network resource, according to an example embodiment.
Figure 5B:
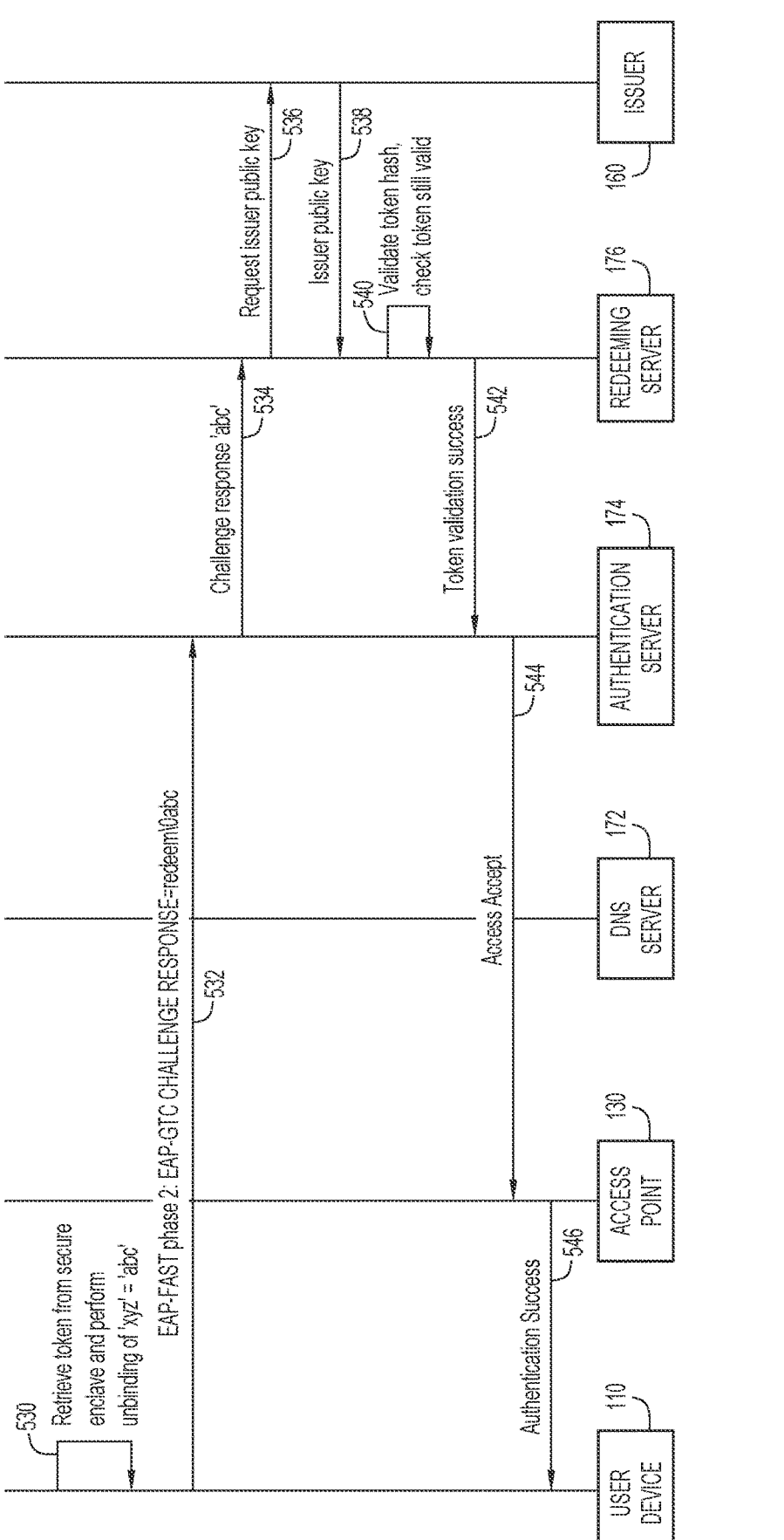

Reference is now made to FIGS. 5A and 5B for a description of a redemption process 500. At 510, the user device 110 scans the wireless spectrum and detects an SSID with a hotspot beacon, for example. At 512, the user device 110 performs an Access Network Query Protocol (ANQP) request for the detected SSID and receives a response that matches a profile that is stored in the user device 110 (obtained at steps 430 and 432 in FIG. 4). The user device 110 associates with the Access Point 130 and at 514, the Access Point 130 issues an authentication identity request, e.g., an EAP-Identity request (EAP-FAST or TEAP), to the user device 110. At 516, the user device 110 issues an identity response with an anonymized identity (anonymous@redeemer.com) based on the information in the profile stored on the user device. At 518, the Access Point 130 discovers the IDP for the user realm (redeemer-.com), and this may be achieved in multiple ways. In one example, the Access Point 130 has the redeemer address statically configured on it. In another example, the Access Point 130 dynamically discovers it against public redeemers. For example, the Wireless Broadband Alliance maintains DNS records for a plurality of publicly available IDP redeemers under privacypass.openroaming.org, or the Issuer 160 works with a private (set of) redeemer(s) that are DNS discoverable.

At 520, the Access Point 130 sets up a secure tunnel to the IDP, i.e., to the Authentication Server 174. In one example, the Access Point 130 uses a Radius Secure Transport Layer Security (RADSEC) tunnel to the IDP with OpenRoaming Public Key Infrastructure (PKI). At 522, the user device 110 and the Authentication Server 174 perform tunnel setup, such as EAP-FAST or TEAP phase 1 TLS tunnel setup. After tunnel setup is complete (EAP-FAST or TEAP phase 1 completes), the Authentication Server 174 sends a request to the Redeeming Server 176 to request a challenge, at 524. At 526, the Redeeming Server 176 issues a challenge 'xyz' and sends it to the Authentication Server 174.

At 528, the Authentication Server 174 starts authentication with the user device 110, via the Access Point 130. For example, the Authentication Server 174 starts EAP-FAST phase 2 authentication and issues an EAP-Generic Token Card (EAP-GTC) challenge to the user device 110: CHALLENGE='xyz' At 530, in response to receiving the challenge, the user device 110 retrieves a token from its secure enclave and calculates a challenge response using the retrieved token to produce, for example, the challenge response 'abc'. This may be referred to as "unblinding" of the authentication challenge 'xyz' to derive the challenge response 'abc'. The unblinding is a cryptographical verification of the calling issued by the Redeemer, verifying that it was in fact generated by the Issuer by which the device's tokens were signed. Unblinding thus involves producing a signature that can be verified. One example of a blind/unblind procedure is described in Section 5.1.3 of https://datatracker.ietf.org/doc/html/draft-irtf-cfrg-rsa-blind-signatures-02. The computation used in the unblinding may, as one example, be the same as for the double web method, described in clause 6 of https://www.ietf.org/archive/id/draft-ietf-privacypass-protocol-04.html#name-client-to-issuer-request-2.

At 532, the user device 110 sends to the Authentication Server 174 the challenge response, e.g., an EAP-GTC challenge response: RESPONSE=redeem\0abc. At 534, the Authentication Server 174 sends the challenge response to the Redeeming Server 176.

At 536, the Redeeming Server 176 retrieves the public key from the Issuer 160, and at 538, the Issuer 160 responds with the public key.

At 540, the Redeeming Server 176 validates the challenge response 'abc' that was derived from the token (referred to as the token hash) and checks if the token associated with the challenge response is still valid. As explained above, the public key is provided by the Issuer to the Redeeming Server either out-of-band or is made available publicly by the Issuer. The validation that the Redeeming Server 176 performs involves a signature validation to validate that the challenge response was signed by the Issuer. The Redeeming Server 176 may leverage an authentication mechanism, such as, RSASSA-PSS-VERIFY (https://www.rfc-editor.org/rfc/rfc3447.html#section-8.1.2). In another example, validating the challenge response may involve using operational principles of https://www.ietf.org/archive/id/draft-ietf-privacy-pass-protocol-04.html#name-client-to-issuer-request-2.

If the Redeeming Server 176 validates the challenge response at step 540, then at 542, the Redeeming Server 176 returns a token validation success to the Authentication Server 174. At 544, the Authentication Server 174 sends an accept (access accept) to the Access Point 130. At 546, the Access Point 130 sends an Authentication Success to the user device 110. The user device 110 can now request an IP Address (e.g., from the DNS server 172 or other DNS server not shown).

The techniques depicted by FIGS. 4 and 5 involve leveraging a one-time token obtained from the Issuer in a resource profile (e.g., wireless network profile). A token generated with a double-blind method is incorporated into that resource profile, and subsequently used in a challenge handshake protocol on the user device for redemption. After the user device does the unblinding, it calculates the challenge response using the Token. There is no process heretofore known in which a token generated by an Issuer is then used to compute a challenge response and include the computed challenge response in an authentication challenge response (such as an EAP-GTC challenge response).

Figure 6A:
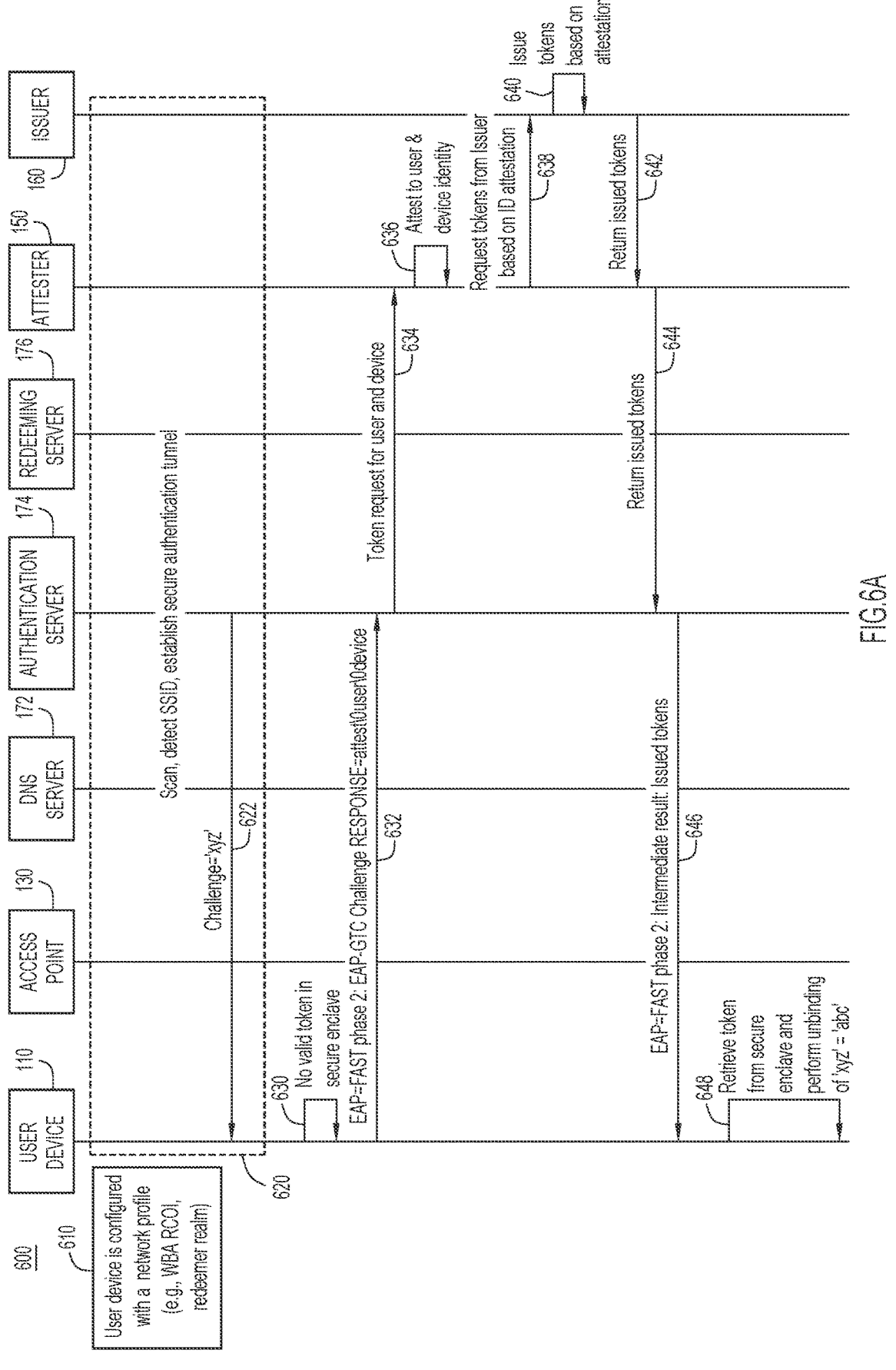
FIGS. 6A and 6B illustrate a sequence diagram depicting an in-band issuance process by which a user device may obtain tokens from an issuer during an authentication session, according to an example embodiment.
Figure 6B:
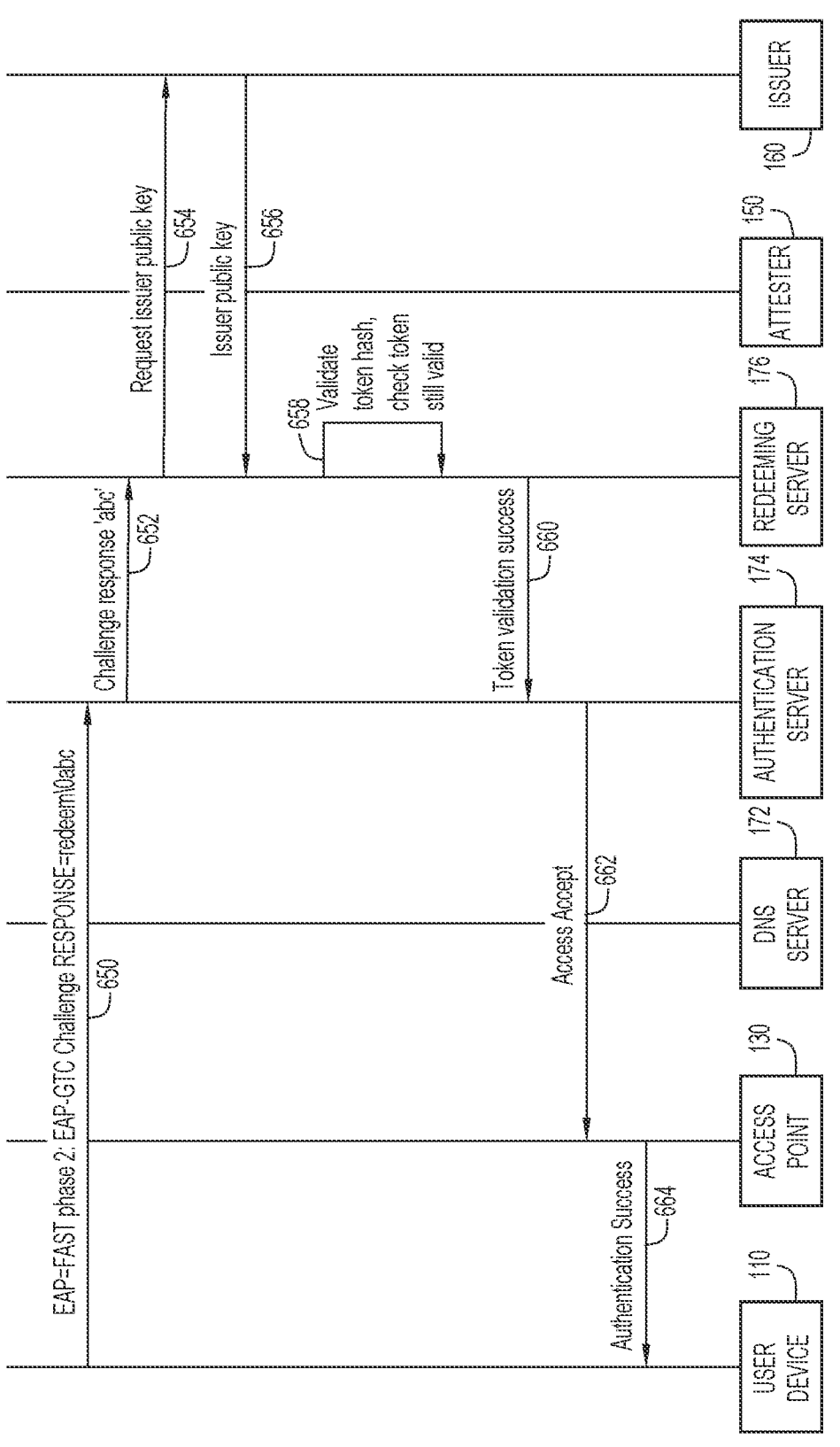

Reference is now made to FIGS. 6A and 6B for a description of an in-band issuance process 600. In the in-band issuance process 600, the user device 110 leverages a tunneled authentication exchange with the IDP, and the capability of these protocols to obtain a token issued by the Issuer during a session, based on the challenge received by the Redeemer over the established secure authentication tunnel, effectively chaining two secure authentication tunnel exchanges. One example scenario involves a user traveling to another country and the user did not use the user device before departing in order to obtain more valid tokens. The user arrives at the airport or other venue and desires to access a resource, e.g., wireless network connectivity. The in-band issuance process 600 allows for a user to obtain tokens at the time the user desires access to a resource, e.g., network connectivity.

At 610, the user device 110 is already configured with a network profile (e.g., WBA RCOI, redeemer realm, etc.) obtained as shown in steps 430 and 432 of FIG. 4 during out-of-band issuance. At 620, the user device performs scanning of the wireless spectrum, detecting an SSID, and establishing a secure authentication tunnel (a first instance of a secure authentication tunnel) with the Authentication Server 174 (and indirectly with the Redeeming Server 176) similar to the operations depicted at steps 510-528 of FIG. 5A and described above. As described in connection with FIG. 5A above, the Redeeming Server 176 issues a challenge 'xyz' and sends it to the Authentication Server 174, and the Authentication Server 174 starts phase 2 authentication, issuing an challenge (e.g., EAP-GTC) to the user device 110: CHALLENGE='xyz' shown at 622. However, as shown at 630, the user device 110 determines that it does not have any valid tokens in its secure enclave, and needs attestation to receive a token in order to proceed. Therefore, at 632, the user device 110 requests attestation by responding to the EAP-GTC challenge from the Authentication Server 174 with its attestation request: RESPONSE=attest\0user\0device. At 634, the Authentication Server 174 sends to the Attester 150 a token request for the user and user device 110. At 636, the Attester 150 verifies that the user identity and user device identity are in good standing, and if so, at 638, the Attester 150 requests one or more tokens with lifetime x from the Issuer 160. At 640, the Issuer 160 generates/issues tokens based on the attestation at 636 and at 642 returns the issued tokens to the Attester 150. The Attester 150 returns the one or more tokens to the Authentication Server 174, at 644.

At 646, the Authentication Server 174 encapsulates the one or more tokens in a type length value (TLV) inside an intermediate result TLV and returns it to the user device 110. At 648, the user device can store the token in its secure enclave, and then immediately retrieve it and perform an unblinding to generate a challenge response to a challenge (previously issued to the user device 110 at 622). The user device 110 can respond to that challenge using a token, and at 650 responds to the (EAP-GTC) challenge 622 from the Authentication Server 174 with RESPONSE=redeem\0abc. The Authentication Server 174 sends the challenge response to the Redeeming Server 176, at 652. At 654, the Redeeming Server 176 retrieves the public key from the Issuer 160, which responds with the public key at 656.

At 658, the Redeeming Server 176 validates the challenge response 'abc' that was derived from the token (referred to as the token hash) and checks if the token associated with the challenge response is still valid. Assuming the validity of the token is confirmed, the Redeeming Server 176 returns success to the Authentication Server 174, at 660. At 662, the Authentication Server 174 then sends an access accept to the Access Point 130, and at 664, the Access Point 130 sends an authentication success (EAP Success) to the user device 110. The user device 110 can now request an IP Address from the DNS server 172 to obtain network connectivity.

To summarize, FIGS. 6A and 6B illustrate a process for in-band remediation/in-band issuance by which a user device may obtain new tokens. The user device has been issued a number of tokens when signing up for service and stores those tokens locally. The user is responsible for refreshing these tokens out-of-band (such as by the process shown in FIG. 4), so that the tokens can be leveraged upon authentication. If at the time of authentication, the user device does not have any valid tokens in its secure enclave, the user device can leverage in-band issuance and thereby obtain a token from the Issuer during an authentication session, in order to remediate the lack of token situation, without out-of-band access to the Attester. Once connected, the user device can leverage out-of-band issuance again to request additional tokens. Again, this can be useful if the user is trying to connect to a wireless network at a venue with the tokens it already has (obtained out-of-band or in advance), but the tokens are about to expire. So, with out-of-band issuance with in-band remediation, the user device can refresh the tokens while it is connected to the infrastructure.

In accordance with a further embodiment, a long-lived remediation token is provided (for a short-lived or temporary session) for use in the event that all prefetched (obtained via out-of-band issuance or in-band issuance) tokens have expired. The remediation token allows a user device to temporarily connect to a network for remediation only. To this end, a token type evaluation is established so that the Redeeming Server 176 can determine whether a token is a regular redemption (one-time use) token or a remediation token.

When the Attester 150 requests issuance of a set of tokens for a user device during (out-of-band issuance), the Attester 150 may also request a remediation token, with a long-lived (or infinite) validity, for later use by the user device. When the user device is in a situation in which it is authenticating to a network without having any valid tokens, upon receiving a challenge by the Authentication Server 174, the user device will respond using its remediation token (that was obtained during out-of-band issuance). The Redeeming Server 176 will check validity and token type, and determine that the token used to generate the challenge response is a remediation token. The Redeeming Server 176 then will instruct the Authentication Server 174 to allow network access for remediation only. The Authentication Server 174 will then send an access accept with a de-authentication imminent message that specifies with appropriate timers to allow the user device sufficient time to renew its tokens. After the user device obtains new tokens process, it will de-associate and re-associate with one of the new tokens received to obtain full network access.

Figure 7A:
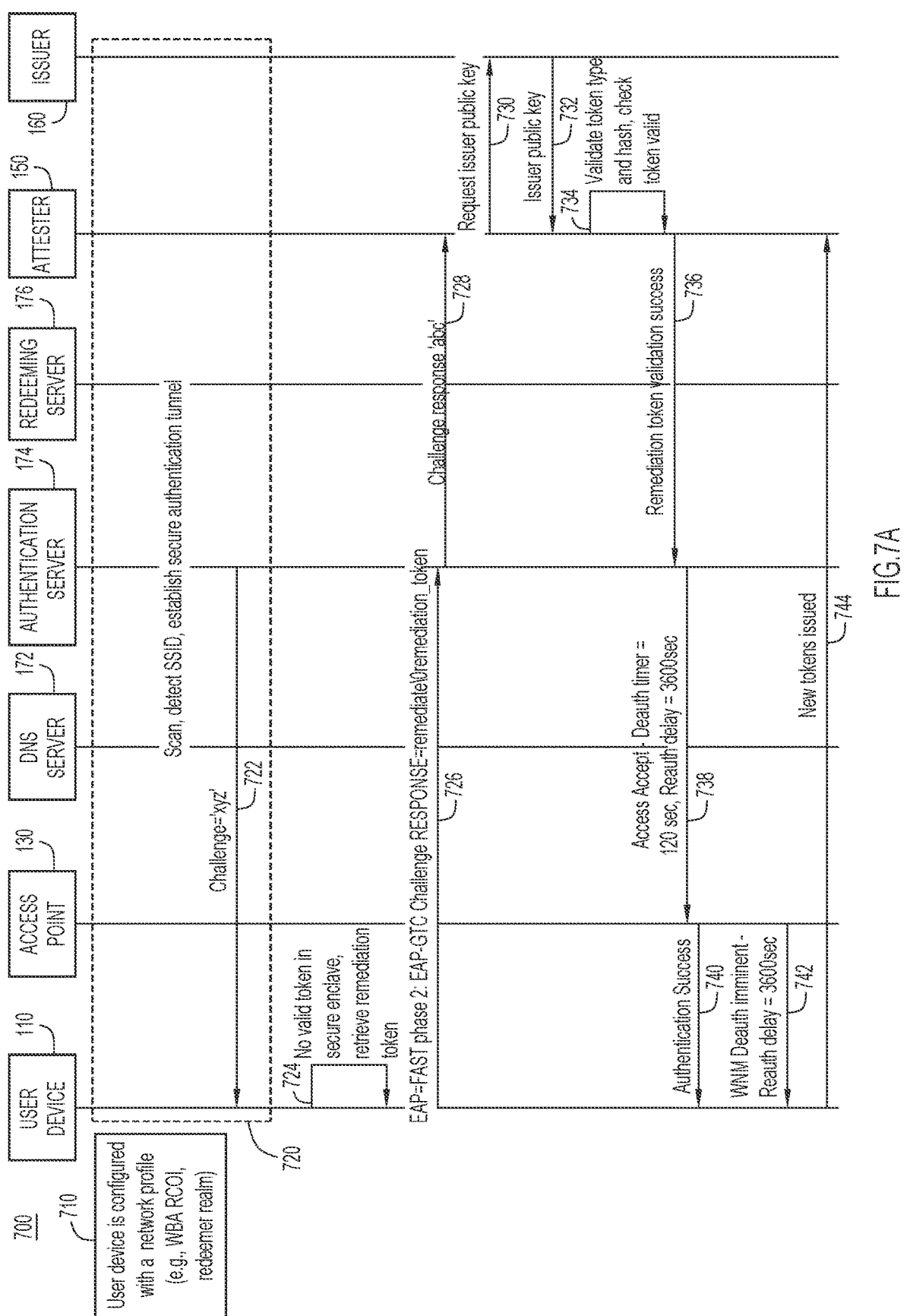
FIGS. 7A and 7B illustrate a sequence diagram of a remediation process by which a user device may use a specialized remediation token in order to obtain sufficient access to engage in an in-band issuance process to obtain one or more tokens for sustained access to a network resource, according to an example embodiment.
Figure 7B:
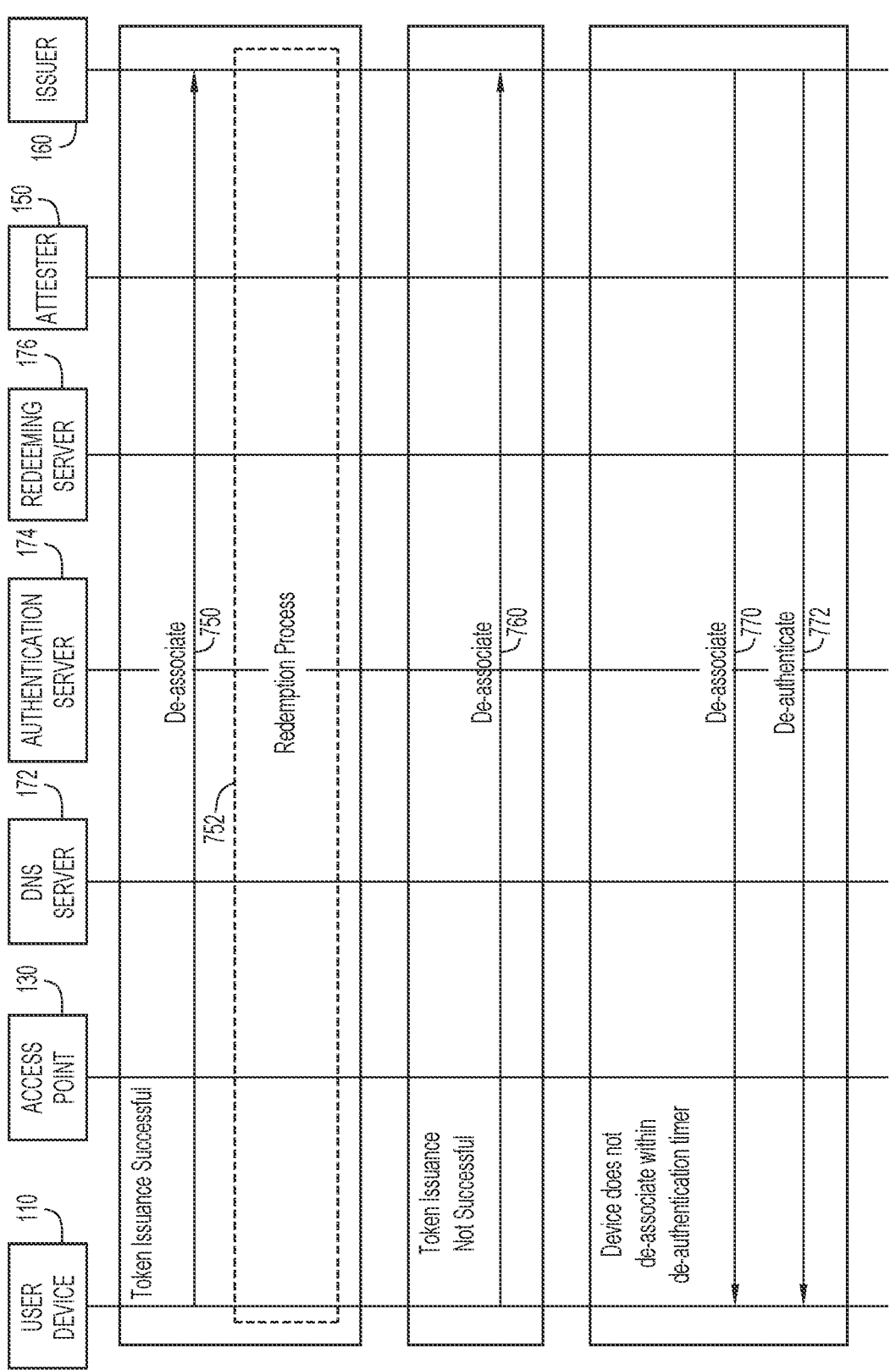

Reference is now made to FIGS. 7A and 7B, which show a sequence diagram for this remediation process shown at reference numeral 700. At 710, the user device 110 is configured with a network profile as described above in connection with FIGS. 6A and 6B. Also, the user device has previously been provided with a remediation token, that is, a token with a type indicating that it is to be allowed network access for remediation only, as described above. As shown at 720, the user device 110 performs scanning of the wireless spectrum, detecting an SSID, and establishing a secure authentication tunnel (a first instance of a secure authentication tunnel) with the Authentication Server 174 (and indirectly with the Redeeming Server 176) similar to the operations depicted at steps 510-528 of FIG. 5A and described above. As described in connection with FIG. 5A above, the Redeeming Server 176 issues a challenge 'xyz' and sends it to the Authentication Server 174, and the Authentication Server 174 starts phase 2 authentication, issuing a challenge (e.g., EAP-GTC) to the user device 110: CHALLENGE='xyz' shown at 722.

At 724, the user device 110 determines that it does not have any valid tokens in its secure enclave, but as explained above in connection with 710, it has been previously configured with a remediation token. Thus, at 724, the user device 110 retrieves the stored remediation token to initiation a connection in order to renew its tokens, i.e., obtain new tokens.

At 726, the user device 110 responds to the challenge at 722 with a challenge response that is generated based on the stored remediation token, e.g., RESPONSE=remediate\0abc. The Authentication Server 174 receives the challenge response and, at 728, forwards it to the Redeeming Server 176.

At 730, the Redeeming Server 176 sends a request to the Issuer 160 to retrieve the public key from the Issuer, and the Issuer 160 responds with the public key at 732.

Using the public key and the challenge response, at 734, the Redeeming Server 176 validates the token type and token hash. That is, the Redeeming Server 176 verifies that the user device 110 generated a challenge response with a remediation token, rather than a regular token. At 736, the Redeeming Server 176 returns success to the Authentication Server 174 with an indicator of a type remediation (remediation token validation success).

At 738, the Authentication Server 174 sends an access accept to the Access Point 130, with de-authentication imminent attributes. The de-authentication imminent attributes may include a de-auth timer of 120 sec (time allowed online to remediate) and a re-auth delay of 3600 sec (time the user device should back off from remediation if it is not successful), for example. At 740, the Access Point 130 sends an authentication success message to the user device 110 and the de-authentication imminent attributes at 742. The user device 110 can now request an IP Address, and can remain online for the duration of the de-auth timer. At 744, the user device 110 can initiate an issuance process to obtain new tokens, e.g., using the out-of-band issuance process 400 shown in FIG. 4, for example.

Turning now to FIG. 7B, if the Issuance is successful, the user device 110 will de-associate at 750, and then reassociate and start the regular redemption process shown at reference numeral 752, which involves performing operations of redemption process 500 shown in FIGS. 5A and 5B (beginning with operation 514).

If the issuance is unsuccessful, the user device will de-associate at 760 and not try to remediate again until the re-auth timer has expired.

If the device does not de-associate within the de-authentication timer, the network (via Access Point 130) will de-authenticate and de-associate the device, as shown at 770 and 772, and will not allow re-association until the re-authentication timer has expired.

Reference is now made to FIG. 8, which illustrates a flow chart for a method 800 involving operations performed by an IDP (e.g., Redeeming Server) during attempted redemption by a user device, according to an example embodiment. At step 810, the method 800 involves receiving, on behalf of a user device, a request to obtain access to a network resource. In one example, the network resource is network connectivity via a wireless local area network. The request may be received as part of a secure authentication protocol via an access point that is in communication with the user device. At step 820, the method 800 involves sending, via the secure authentication protocol, an authentication challenge to the user device via the access point. At step 830, the method 800 involves receiving, via the secure authentication protocol, a challenge response generated by the user device based on a token, wherein the token is (e.g., has been) provided by an issuer and is included in a profile stored on the user device. At step 840, the method 800 involves evaluating the challenge response.

In one example, the secure authentication protocol is the Extensible Authentication Protocol-Flexible Authentication via Secure Tunneling (EAP-FAST) protocol or the Tunnel Extensible Authentication Protocol (TEAP). In one example, the request received at step 810 is received as part of a first phase of the EAP-FAST protocol authentication or a first phase of the TEAP authentication. In one example, the step of sending the authentication challenge at step 820 may involve sending an EAP token card challenge as part of a second phase of the EAP-FAST protocol authentication or a second phase of the TEAP authentication, and receiving the challenge response at step 830 is part of an EAP token card challenge response.

The IDP (e.g., Redeeming Server) may, based on the challenge response received at step 830, determine a type of the token used to generate the challenge response, and step 840 of evaluating the challenge response may be based on the type of token.

When the Redeeming Server determines that the type of the token used to generate the challenge response is a one-time token obtained from the Issuer to permit the user device to have sustained access to the network resource, step 840 of evaluating may involve evaluating the challenge response to determine whether to permit or deny access of the user device to the network resource. Token validation success is declared when it is determined, based on a public key obtained from the Issuer, that the challenge response was generated by the user device with a valid token. This is the situation of redemption where the Redeeming Server redeems the token issued to the user device to permit network access for the user device.

On the other hand, when the Redeeming Server determines that the challenge response was generated using a remediation token that allows the user device to temporarily access the network resource, the step 840 of evaluating involves evaluating the remediation token to determine whether to allow the user device to perform remediation by which the user device may attempt to obtain one or more new tokens that permit the user device to have sustained access to the network resource. The evaluating step 840 may involve declaring remediation token validation success when it is determined, based on a public key obtained from the Issuer, that the challenge response was generated by the user device with a valid remediation token. When this occurs, the method 800 further includes sending an access accept message to the user device via the access point. The access accept message includes information indicating a period of time that the user device is allowed to access the network resource for remediation. In one example, the access accept message includes information indicating a period of time that the user device should back off from attempting remediation again if it is not successful.

In one example, the access point is configured to participate in a trusted authentication federation for device authentication, and steps of receiving the request, sending the authentication challenge, receiving the challenge response, and evaluating the challenge response are performed by one or more servers of an identity provider configured to participate in the trusted authentication federation. The request received at step 810 may indicate, based on the profile stored in the user device, an identifier according to the trusted authentication federation and an anonymous identity with an identity provider redeemer realm.

Turning now to FIG. 9, a flow chart is shown depicting operations of a method 900 by an IDP (e.g., Redeeming Server) during in-band issuance. At step 910, the method 900 involves receiving, on behalf of a user device, a request to obtain access to a network resource. The request may be received as part of a secure authentication protocol via an access point that is in communication with the user device. At step 920, the method 900 involves sending, via the secure authentication protocol, an authentication challenge to the user device via the access point. At step 930, the method 900 involves receiving, via the secure authentication protocol, a challenge response generated by the user device. The challenge response may include an attestation request to be forwarded to an Attester to enable the Attester to obtain one or more tokens for the user device if the Attester attests a user device identity and a user identity of a user associated with the user device.

In one form, the method 900 may further include steps of receiving, from the attester, the one or more tokens; and sending to the user device, via the access point, a message that includes the one or more tokens.

As explained above in connection with FIG. 8, the secure authentication protocol may be the Extensible Authentication Protocol-Flexible Authentication via Secure Tunneling (EAP-FAST) protocol or the Tunnel Extensible Authentication Protocol (TEAP). The request received at step 910 may be received as part of a first phase of the EAP-FAST protocol authentication or a first phase of the TEAP authentication. The step 920 of sending the authentication challenge may involve sending an EAP token card challenge as part of a second phase of the EAP-FAST protocol authentication or a second phase of the TEAP authentication. The challenge response may be received as part of the second phase of the EAP-FAST protocol authentication or the second phase of the TEAP authentication. Furthermore, the message that includes the one or more tokens may be sent as an intermediate result as part of the second phase of the EAP-FAST protocol authentication or the second phase of the TEAP authentication.

Reference is now made to FIG. 10, which illustrates a flow chart for a method 1000 performed by a user device during attempted redemption. At step 1010, the method 1000 involves sending, from a user device to an identity provider, a request to obtain access to a network resource. The request may be sent as part of a secure authentication protocol via an access point that is in communication with the user device. At step 1020, the method 1000 involves receiving, via the secure authentication protocol from the identity provider, an authentication challenge. At step 1030, based on the authentication challenge, the method 1000 involves generating a challenge response using a token stored by the user device. At step 1040, the method 1000 involves sending the challenge response, via the secure authentication protocol, to the identity provider.

The method 1000 may further include a step of storing a profile on the user device, wherein the profile includes an identifier according to a trusted authentication federation and an anonymous identity with an identity provider realm.

In one example, the token is a one-time token obtained from an Issuer to permit the user device to have sustained access to the network resource.

The method 1000 may evolve from attempted redemption to remediation. In other words, the method 1000 may further include a step of determining that the user device has no valid one-time tokens stored to enable the user device to have sustained access to the network resource. When this occurs, the step 1030 of generating the challenge response is performed based on a remediation token stored on the user device that allows the user device to temporarily access the network resource and perform remediation by which the user device may attempt to obtain one or more new one-time tokens that permit the user device to have sustained access to the network resource. The method 1000 may further include a step of receiving an access accept message that includes information indicating a period of time that the user device is allowed to access the network resource for remediation.

Reference is now made to FIG. 11, which shows a flow chart for a method 1100 involving operations performed by a user device during in-band issuance. At step 1110, the method 1100 involves sending, from a user device to an identity provider, a request to obtain access to a network resource. The request may be sent as part of a secure authentication protocol via an access point that is in communication with the user device. At step 1120, the method 1100 involves receiving, via the secure authentication protocol from the identity provider, an authentication challenge. At step 1130, the method 1100 involves determining that the user device has no valid tokens stored to enable the user device to have access to the network resource. At step 1140, the method 1100 involves, based on the authentication challenge, generating a challenge response that includes an attestation request to be forwarded to an attester to enable the attester to obtain one or more new tokens for the user device if the attester attests a user device identity and a user identity of a user associated with the user device. At step 1150, the method 1100 involves the user device sending the challenge response to the identity provider.

The method 1100 may further include the step of receiving from the identity provider a message that includes the one or more new tokens. The method 1100 may still further include steps of: after receiving the message that includes the one or more new tokens, generating a challenge response based on one of the one or more new tokens; and sending the challenge response based on one of the one or more new tokens to the identity provider.

As explained above, the secure authentication protocol referenced in FIGS. 10 and 11 may be the Extensible Authentication Protocol-Flexible Authentication via Secure Tunneling (EAP-FAST) protocol or the Tunnel Extensible Authentication Protocol (TEAP). The request sent at steps 1010 and 1110 may be sent as part of a first phase of the EAP-FAST protocol authentication or a first phase of the TEAP authentication. The steps 1020 and 1120 of receiving the authentication challenge may involve receiving an EAP token card challenge as part of a second phase of the EAP-FAST protocol authentication or a second phase of the TEAP authentication. The challenge response may be sent as part of the second phase of the EAP-FAST protocol authentication or the second phase of the TEAP authentication. Furthermore, the message that includes the one or more tokens may be received as an intermediate result as part of the second phase of the EAP-FAST protocol authentication or the second phase of the TEAP authentication.

The techniques presented herein may be useful in situations where access to a network resource, e.g., wireless network (such as public Wi-Fi wireless network access) with or without a trusted authentication federation (e.g., Open-Roaming technology).

In summary, techniques are provided for double blind private Wi-Fi wireless networking using an authentication method that allows the network to authenticate a user identity against an IDP, without disclosing any identifiable information about that user to the network, or any information about that user's location or behavior to the identity provider.

Figure 12:
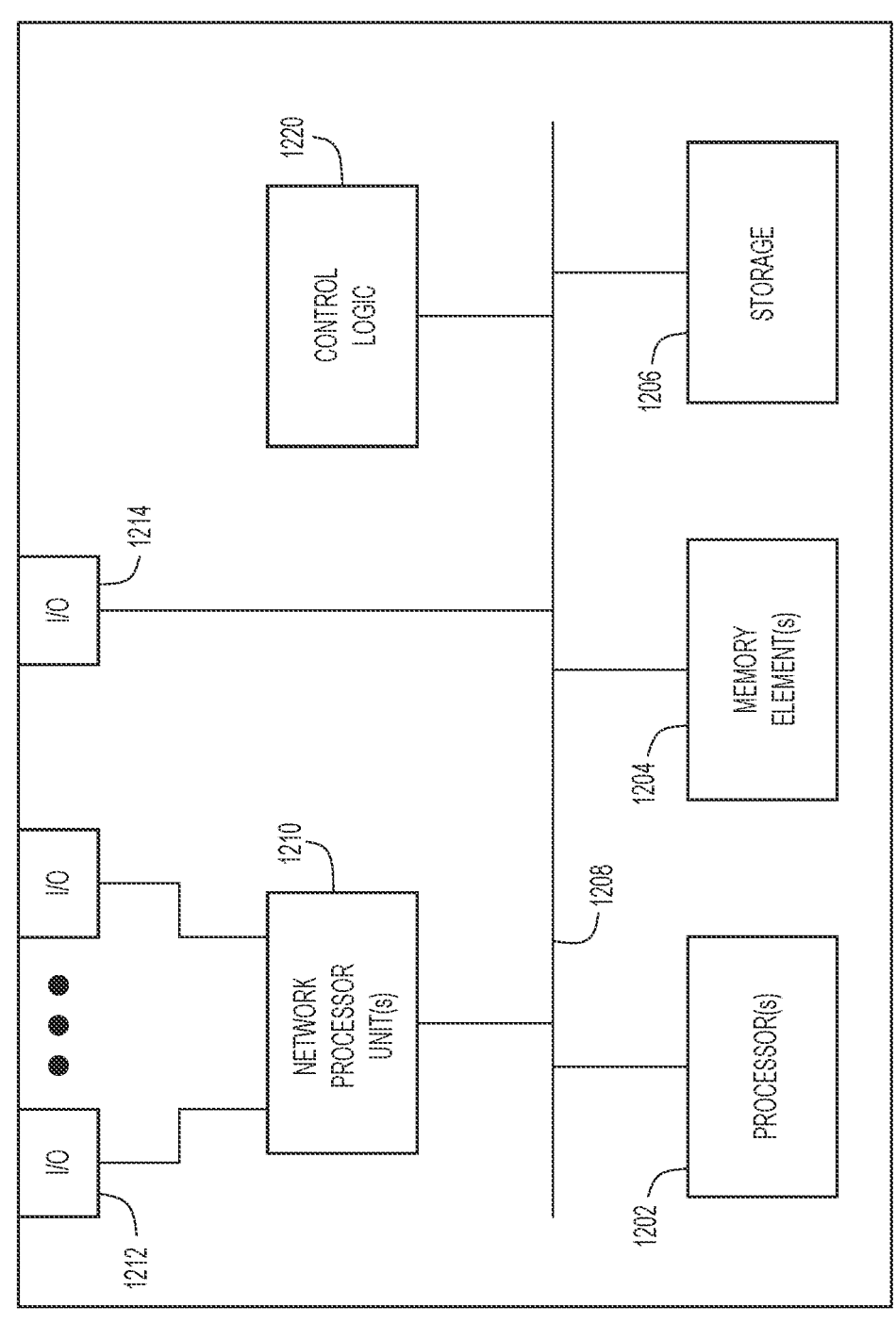
FIG. 12 is a block diagram of one or more computing devices that may be configured to perform operations of an identity provider (e.g., authentication server and/or redeeming server of an identity provider), according to an example embodiment.

Referring to FIG. 12, FIG. 12 illustrates a hardware block diagram of a computing device 1200 that may perform functions associated with operations performed by an identity provider (e.g., Redeeming Server) discussed herein in connection with the techniques depicted in FIGS. 1-4, 5A, 5B, 6A, 6B, 7A, 7B, 8 and 9. In various embodiments, a computing device or apparatus, such as computing device 1200 or any combination of computing devices 1200, may be configured as any entity/entities as discussed for the techniques depicted in connection with FIGS. 1-4, 5A, 5B, 6A, 6B, 7A, 7B, 8 and 9 in order to perform operations of the various techniques discussed herein.

In at least one embodiment, the computing device 1200 may be any apparatus that may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220. In various embodiments, instructions associated with logic for computing device 1200 can overlap in any manner and are not limited to the specific allocation of instructions and/or operations described herein.

In at least one embodiment, processor(s) 1202 is/are at least one hardware processor configured to execute various tasks, operations and/or functions for computing device 1200 as described herein according to software and/or instructions configured for computing device 1200. Processor(s) 1202 (e.g., a hardware processor) can execute any type of instructions associated with data to achieve the operations detailed herein. In one example, processor(s) 1202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with computing device 1200, and/or logic configured for memory element(s) 1204 and/or storage 1206. For example, any logic described herein (e.g., control logic 1220) can, in various embodiments, be stored for computing device 1200 using any combination of memory element(s) 1204 and/or storage 1206. Note that in some embodiments, storage 1206 can be consolidated with memory element(s) 1204 (or vice versa), or can overlap/exist in any other suitable manner.

In at least one embodiment, bus 1208 can be configured as an interface that enables one or more elements of computing device 1200 to communicate in order to exchange information and/or data. Bus 1208 can be implemented with any architecture designed for passing control, data and/or information between processors, memory elements/storage, peripheral devices, and/or any other hardware and/or software components that may be configured for computing device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between computing device 1200 and other systems, entities, etc., via network I/O interface(s) 1212 (wired and/or wireless) to facilitate operations discussed for various embodiments described herein. In various embodiments, network processor unit(s) 1210 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1200 and other systems, entities, etc. to facilitate operations for various embodiments described herein. In various embodiments, network I/O interface(s) 1212 can be configured as one or more Ethernet port(s), Fibre Channel ports, any other I/O port(s), and/or antenna(s)/antenna array(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214 allow for input and output of data and/or information with other entities that may be connected to computing device 1200. For example, I/O interface(s) 1214 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1220 can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1204 and/or storage 1206 can store data, software, code, instructions (e.g., processor instructions), logic, parameters, combinations thereof, and/or the like used for operations described herein. This includes memory element(s) 1204 and/or storage 1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable.

For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 13:
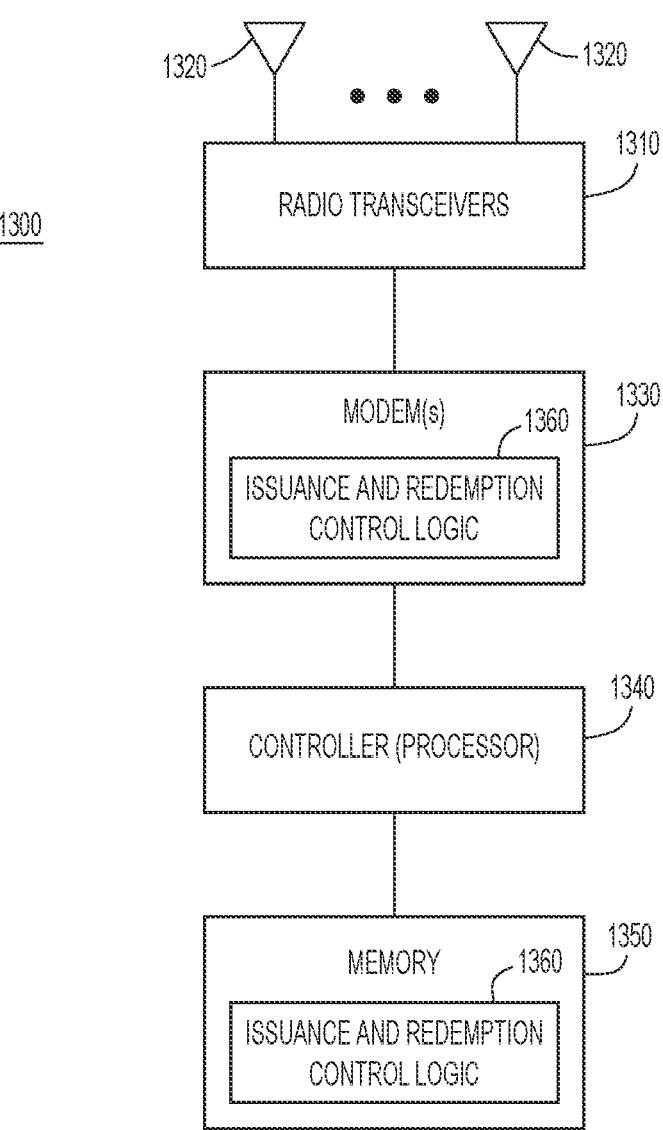
FIG. 13 is a block diagram of a user device that may be configured to perform operations presented herein, according to an example embodiment.

Reference is now made to FIG. 13. FIG. 13 shows a block diagram of a user device 1300 (e.g., a wireless client device) configured to operate in accordance with the embodiments presented herein, e.g., to perform the user device operations described in connection with FIGS. 1-4, 5A, 5B, 6A, 6B, 7A, 7B, 10 and 11. The user device 1300 includes a radio transceiver 1310 (or multiple radio transceivers), one or more antennas 1320, a modem 1330 (or multiple modems), a controller (e.g., a microprocessor) 1340 and memory 1350. The modem 1330 may be configured with issuance and redemption control logic 1360 to control operation of the user device 1300 during in-band issuance and redemption (including remediation). Alternatively, the memory 1350 may store software instructions for the issuance and redemption control logic 1360 that, when executed by the controller 1340, cause the controller 1340 to perform the user device operations described in connection with FIGS. 1-4, 5A, 5B, 6A, 6B, 7A, 7B, 10 and 11 on behalf of the user device 1300.

In one form, the issuance and redemption control logic 1360 may be embodied by digital logic in an Application Specific Integrated Circuit (ASIC) or field programmable gate array, or other logic configurable device.

The memory 1350 may comprise read only memory (ROM), random access memory (RAM), magnetic disk storage media devices, optical storage media devices, flash memory devices, electrical, optical, or other physical/tangible memory storage devices. Thus, in general, the memory 1350 may comprise one or more tangible (non-transitory) computer readable storage media (e.g., a memory device) encoded with software comprising computer executable instructions and when the software is executed (by the controller 1340) it is operable to perform the operations described herein.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio- Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X. Y or Z', 'one or more of X, Y and Z', 'one or more of X. Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a method including: receiving, on behalf of a user device, a request to obtain access to a network resource, the request being received as part of a secure authentication protocol via an access point that is in communication with the user device; sending, via the secure authentication protocol, an authentication challenge to the user device via the access point; receiving, via the secure authentication protocol, a challenge response generated by the user device based on a token, wherein the token is provided by an issuer and is included in a profile stored on the user device; and evaluating the challenge response.

In some aspects, the techniques described herein relate to a method, wherein the secure authentication protocol is the Extensible Authentication Protocol-Flexible Authentication via Secure Tunneling (EAP-FAST) protocol or the Tunnel Extensible Authentication Protocol (TEAP).

In some aspects, the techniques described herein relate to a method, wherein the request is received as part of a first phase of the EAP-FAST protocol authentication or a first phase of the TEAP authentication.

In some aspects, the techniques described herein relate to a method, wherein sending the authentication challenge includes sending an EAP token card challenge as part of a second phase of the EAP-FAST protocol authentication or a second phase of the TEAP authentication, and wherein receiving the challenge response as part of an EAP token card challenge response.

In some aspects, the techniques described herein relate to a method, further including: based on the challenge response, determining a type of the token used to generate the challenge response, wherein evaluating is based on the type of token.

In some aspects, the techniques described herein relate to a method, further including: when it is determined that the type of the token used to generate the challenge response is a one-time token obtained from the issuer to permit the user device to have sustained access to the network resource, evaluating includes evaluating the challenge response to determine whether to permit or deny access of the user device to the network resource.

In some aspects, the techniques described herein relate to a method, wherein evaluating includes: declaring token validation success when it is determined, based on a public key obtained from the issuer, that the challenge response was generated by the user device with a valid token.

In some aspects, the techniques described herein relate to a method, further including: when it is determined that the challenge response was generated using a remediation token that allows the user device to temporarily access the network resource, the evaluating includes evaluating the remediation token to determine whether to allow the user device to perform remediation by which the user device may attempt to obtain one or more new tokens that permit the user device to have sustained access to the network resource.

In some aspects, the techniques described herein relate to a method, wherein evaluating includes: declaring remediation token validation success when it is determined, based on a public key obtained from the issuer, that the challenge response was generated by the user device with a valid remediation token.

In some aspects, the techniques described herein relate to a method, further including: sending an access accept message to the user device via the access point, wherein the access accept message includes information indicating a period of time that the user device is allowed to access the network resource for remediation.

In some aspects, the techniques described herein relate to a method, wherein the access accept message includes information indicating a period of time that the user device should back off from attempting remediation again if it is not successful.

In some aspects, the techniques described herein relate to a method, wherein the network resource is network connectivity via a wireless local area network.

In some aspects, the techniques described herein relate to a method, wherein the access point is configured to participate in a trusted authentication federation for device authentication, and steps of receiving the request, sending the authentication challenge, receiving the challenge response, and evaluating the challenge response are performed by one or more servers of an identity provider configured to participate in the trusted authentication federation.

In some aspects, the techniques described herein relate to a method, wherein the request indicates, based on the profile stored in the user device, an identifier according to the trusted authentication federation and an anonymous identity with an identity provider redeemer realm.

In some aspects, an apparatus is provided comprising one or more network interfaces that enable network communications; one or more processors; and a memory, wherein the one or more processors are configured to perform operations including: receiving, on behalf of a user device, a request to obtain access to a network resource, the request being received as part of a secure authentication protocol via an access point that is in communication with the user device; sending, via the secure authentication protocol, an authentication challenge to the user device via the access point; receiving, via the secure authentication protocol, a challenge response generated by the user device based on a token, wherein the token is provided by an issuer and is included in a profile stored on the user device; and evaluating the challenge response.

In some aspects, one or more non-transitory computer readable storage media are provided that are encoded with instructions that, when executed by a processor, cause the processor to perform operations including: receiving, on behalf of a user device, a request to obtain access to a network resource, the request being received as part of a secure authentication protocol via an access point that is in communication with the user device; sending, via the secure authentication protocol, an authentication challenge to the user device via the access point; receiving, via the secure authentication protocol, a challenge response generated by the user device based on a token, wherein the token is provided by an issuer and is included in a profile stored on the user device; and evaluating the challenge response.

In some aspects, the techniques described herein relate to a method including: receiving, on behalf of a user device, a request to obtain access to a network resource, the request being received as part of a secure authentication protocol via an access point that is in communication with the user device; sending, via the secure authentication protocol, an authentication challenge to the user device via the access point; and receiving, via the secure authentication protocol, a challenge response generated by the user device, the challenge response including an attestation request to be forwarded to an attester to enable the attester to obtain one or more tokens for the user device if the attester attests a user device identity and a user identity of a user associated with the user device.

In some aspects, the techniques described herein relate to a method, further including: receiving, from the attester, the one or more tokens; and sending to the user device, via the access point, a message that includes the one or more tokens.

In some aspects, the techniques described herein relate to a method, wherein the secure authentication protocol is the Extensible Authentication Protocol-Flexible Authentication via Secure Tunneling (EAP-FAST) protocol or the Tunnel Extensible Authentication Protocol (TEAP).

In some aspects, the techniques described herein relate to a method, wherein the request is received as part of a first phase of the EAP-FAST protocol authentication or a first phase of the TEAP authentication.

In some aspects, the techniques described herein relate to a method, wherein sending the authentication challenge includes sending an EAP token card challenge as part of a second phase of the EAP-FAST protocol authentication or a second phase of the TEAP authentication, and wherein the challenge response is received as part of the second phase of the EAP-FAST protocol authentication or the second phase of the TEAP authentication.

In some aspects, the techniques described herein relate to a method, wherein the message that includes the one or more tokens is sent as an intermediate result as part of the second phase of the EAP-FAST protocol authentication or the second phase of the TEAP authentication.

In some aspects, an apparatus is provided comprising one or more network interfaces that enable network communications; one or more processors; and a memory, wherein the one or more processors are configured to perform operations including: receiving, on behalf of a user device, a request to obtain access to a network resource, the request being received as part of a secure authentication protocol via an access point that is in communication with the user device; sending, via the secure authentication protocol, an authentication challenge to the user device via the access point; and receiving, via the secure authentication protocol, a challenge response generated by the user device, the challenge response including an attestation request to be forwarded to an attester to enable the attester to obtain one or more tokens for the user device if the attester attests a user device identity and a user identity of a user associated with the user device.

In some aspects, one or more non-transitory computer readable storage media are provided that are encoded with instructions that, when executed by a processor, cause the processor to perform operations including: receiving, on behalf of a user device, a request to obtain access to a network resource, the request being received as part of a secure authentication protocol via an access point that is in communication with the user device; sending, via the secure authentication protocol, an authentication challenge to the user device via the access point; and receiving, via the secure authentication protocol, a challenge response generated by the user device, the challenge response including an attestation request to be forwarded to an attester to enable the attester to obtain one or more tokens for the user device if the attester attests a user device identity and a user identity of a user associated with the user device.

In some aspects, the techniques described herein relate to a method including: sending, from a user device to an identity provider, a request to obtain access to a network resource, the request being sent as part of a secure authentication protocol via an access point that is in communication with the user device; receiving, via the secure authentication protocol from the identity provider, an authentication challenge; based on the authentication challenge, generating a challenge response using a token stored by the user device; and sending the challenge response, via the secure authentication protocol, to the identity provider.

In some aspects, the techniques described herein relate to a method, wherein the token is a one-time token obtained from an issuer to permit the user device to have sustained access to the network resource.

In some aspects, the techniques described herein relate to a method, further including storing a profile on the user device, wherein the profile includes an identifier according to a trusted authentication federation and an anonymous identity with an identity provider realm.

In some aspects, the techniques described herein relate to a method, further including: determining that the user device has no valid one-time tokens stored to enable the user device to have sustained access to the network resource, wherein generating the challenge response is performed based on a remediation token stored on the user device that allows the user device to temporarily access the network resource and perform remediation by which the user device attempts to obtain one or more new one-time tokens that permit the user device to have sustained access to the network resource.

In some aspects, the techniques described herein relate to a method, further including: receiving an access accept message that includes information indicating a period of time that the user device is allowed to access the network resource for remediation.

In some aspects, an apparatus is provided comprising a wireless transceiver, a modem, one or more processors; and a memory, wherein the one or more processors are configured to perform operations including: causing to be sent by the wireless transceiver, a request to obtain access to a network resource, the request being sent as part of a secure authentication protocol via an access point that is in communication with the apparatus and intended for receipt by an identity provider; causing to receive, via the secure authentication protocol from the identity provider by the wireless transceiver, an authentication challenge; based on the authentication challenge, generating a challenge response using a token stored by the apparatus; and causing to send by the wireless transceiver, the challenge response, via the secure authentication protocol, for receipt by the identity provider.

In some aspects, one or more non-transitory computer readable storage media are provided that are encoded with instructions that, when executed by a processor of a user device, cause the processor to perform operations including: sending, from a user device to an identity provider, a request to obtain access to a network resource, the request being sent as part of a secure authentication protocol via an access point that is in communication with the user device; receiving, via the secure authentication protocol from the identity provider, an authentication challenge; based on the authentication challenge, generating a challenge response using a token stored by the user device; and sending the challenge response, via the secure authentication protocol, to the identity provider.

In some aspects, the techniques described herein relate to a method including: sending, from a user device to an identity provider, a request to obtain access to a network resource, the request being sent as part of a secure authentication protocol via an access point that is in communication with the user device; receiving, via the secure authentication protocol from the identity provider, an authentication challenge; determining that the user device has no valid tokens stored to enable the user device to have access to the network resource; based on the authentication challenge, generating a challenge response that includes an attestation request to be forwarded to an attester to enable the attester to obtain one or more new tokens for the user device if the attester attests a user device identity and a user identity of a user associated with the user device; and sending the challenge response to the identity provider.

In some aspects, the techniques described herein relate to a method, further including: receiving from the identity provider a message that includes the one or more new tokens.

In some aspects, the techniques described herein relate to a method, further including: after receiving the message that includes the one or more new tokens, generating a challenge response based on one of the one or more new tokens; and sending the challenge response based on one of the one or more new tokens to the identity provider.

In some aspects, the techniques described herein relate to a method, wherein the secure authentication protocol is the Extensible Authentication Protocol-Flexible Authentication via Secure Tunneling (EAP-FAST) protocol or the Tunnel Extensible Authentication Protocol (TEAP).

In some aspects, the techniques described herein relate to a method, wherein the request is sent as part of a first phase of the EAP-FAST protocol authentication or a first phase of the TEAP authentication.

In some aspects, the techniques described herein relate to a method, wherein receiving the authentication challenge includes receiving an EAP token card challenge as part of a second phase of the EAP-FAST protocol authentication or a second phase of the TEAP authentication, and wherein the challenge response is sent as part of the second phase of the EAP-FAST protocol authentication or the second phase of the TEAP authentication.

In some aspects, the techniques described herein relate to a method, wherein the message that includes the one or more tokens is received as an intermediate result as part of the second phase of the EAP-FAST protocol authentication or the second phase of the TEAP authentication.

In some aspects, an apparatus is provided comprising a wireless transceiver, a modem, one or more processors; and a memory, wherein the one or more processors are configured to perform operations including: causing to be sent by the wireless transceiver, a request to obtain access to a network resource, the request being sent as part of a secure authentication protocol via an access point that is in communication with the apparatus and intended for receipt by an identity provider; causing to receive, via the secure authentication protocol from the identity provider by the wireless transceiver, an authentication challenge; determining that the apparatus has no valid tokens stored to enable the apparatus to have access to the network resource; based on the authentication challenge, generating a challenge response that includes an attestation request to be forwarded to an attester to enable the attester to obtain one or more new tokens for the apparatus if the attester attests a user device identity and a user identity of a user associated with the apparatus; and causing the challenge response to be sent by the wireless transceiver for receipt by the identity provider.

In some aspects, one or more non-transitory computer readable storage media are provided that are encoded with instructions that, when executed by a processor of a user device, cause the processor to perform operations including: sending, from a user device to an identity provider, a request to obtain access to a network resource, the request being sent as part of a secure authentication protocol via an access point that is in communication with the user device; receiving, via the secure authentication protocol from the identity provider, an authentication challenge; determining that the user device has no valid tokens stored to enable the user device to have access to the network resource; based on the authentication challenge, generating a challenge response that includes an attestation request to be forwarded to an attester to enable the attester to obtain one or more new tokens for the user device if the attester attests a user device identity and a user identity of a user associated with the user device; and sending the challenge response to the identity provider.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A method comprising:
   receiving, on behalf of a user device, a request to obtain access to a network resource, the request being received as part of a secure authentication protocol via an access point that is in communication with the user device;
   sending, via the secure authentication protocol, an authentication challenge to the user device via the access point;
   receiving, via the secure authentication protocol, a challenge response cryptographically generated by the user device by unblinding the authentication challenge using a token, wherein the token is a one-time token provided by an issuer, representing a previously made attestation, to permit the user device to have sustained access to the network resource and is included in a profile stored on the user device; and
   evaluating the challenge response.

2. The method of claim 1, wherein the secure authentication protocol is an Extensible Authentication Protocol-Flexible Authentication via Secure Tunneling (EAP-FAST) protocol or a Tunnel Extensible Authentication Protocol (TEAP) authentication.

3. The method of claim 2, wherein the request is received as part of a first phase of the EAP-FAST protocol authentication or a first phase of the TEAP authentication.

4. The method of claim 3, wherein sending the authentication challenge comprises sending an EAP token card challenge as part of a second phase of the EAP-FAST protocol authentication or a second phase of the TEAP authentication, and wherein receiving the challenge response as part of an EAP token card challenge response.

5. The method of claim 1, further comprising:
   based on the challenge response, determining a type of the token used to generate the challenge response,
   wherein evaluating is based on the type of token.

6. The method of claim 5, further comprising:
   when it is determined that the type of the token used to generate the challenge response is a one-time token obtained from the issuer to permit the user device to have sustained access to the network resource, evaluating comprises evaluating the challenge response to determine whether to permit or deny access of the user device to the network resource.

7. The method of claim 6, wherein evaluating comprises:
   declaring token validation success when it is determined, based on a public key obtained from the issuer, that the challenge response was generated by the user device with a valid token.

8. The method of claim 1, wherein the network resource is network connectivity via a wireless local area network.

9. The method of claim 1, wherein the access point is configured to participate in a trusted authentication federation for device authentication, and steps of receiving the request, sending the authentication challenge, receiving the challenge response, and evaluating the challenge response are performed by one or more servers of an identity provider configured to participate in the trusted authentication federation.

10. The method of claim 9, wherein the request indicates, based on the profile stored in the user device, an identifier according to the trusted authentication federation and an anonymous identity with an identity provider redeemer realm.

11. A method comprising:

receiving, on behalf of a user device, a request to obtain access to a network resource, the request being received as part of a secure authentication protocol via an access point that is in communication with the user device;

sending, via the secure authentication protocol, an authentication challenge to the user device via the access point;

receiving, via the secure authentication protocol, a challenge response generated by the user device based on a token, wherein the token is provided by an issuer and is included in a profile stored on the user device;

based on the challenge response, determining a type of the token used to generate the challenge response; and evaluating the challenge response based on the type of token, when it is determined that the challenge response was generated using a remediation token that allows the user device to temporarily access the network resource, the evaluating comprises evaluating the remediation token to determine whether to allow the user device to perform remediation by which the user device may attempt to obtain one or more new tokens that permit the user device to have sustained access to the network resource.

12. The method of claim 11, wherein evaluating comprises:

declaring remediation token validation success when it is determined, based on a public key obtained from the issuer, that the challenge response was generated by the user device with a valid remediation token.

13. The method of claim 12, further comprising:

sending an access accept message to the user device via the access point, wherein the access accept message includes information indicating a period of time that the user device is allowed to access the network resource for remediation.

14. The method of claim 13, wherein the access accept message includes information indicating a period of time that the user device should back off from attempting remediation again if it is not successful.

15. A method comprising:

receiving, on behalf of a user device, a request to obtain access to a network resource, the request being received as part of a secure authentication protocol via an access point that is in communication with the user device;

sending, via the secure authentication protocol, an authentication challenge to the user device via the access point; and receiving, via the secure authentication protocol, a challenge response generated by the user device, the challenge response including an attestation request to be forwarded to an attester to enable the attester to obtain one or more tokens for the user device if the attester attests a user device identity and a user identity of a user associated with the user device, wherein the attestation request is generated in response to the user device determining that it has no valid tokens stored and initiates a token issuance process for remediation.

16. The method of claim 15, further comprising:

receiving, from the attester, the one or more tokens; and
sending to the user device, via the access point, a message that includes the one or more tokens.

17. The method of claim 16, wherein the secure authentication protocol is an Extensible Authentication Protocol-Flexible Authentication via Secure Tunneling (EAP-FAST) protocol or a Tunnel Extensible Authentication Protocol (TEAP) authentication.

18. The method of claim 17, wherein the request is received as part of a first phase of the EAP-FAST protocol authentication or a first phase of the TEAP authentication.

19. The method of claim 18, wherein sending the authentication challenge comprises sending an EAP token card challenge as part of a second phase of the EAP-FAST protocol authentication or a second phase of the TEAP authentication, and wherein the challenge response is received as part of the second phase of the EAP-FAST protocol authentication or the second phase of the TEAP authentication.

20. The method of claim 19, wherein the message that includes the one or more tokens is sent as an intermediate result as part of the second phase of the EAP-FAST protocol authentication or the second phase of the TEAP authentication.

21. A method comprising:

sending, from a user device to an identity provider, a request to obtain access to a network resource, the request being sent as part of a secure authentication protocol via an access point that is in communication with the user device;

receiving, via the secure authentication protocol from the identity provider, an authentication challenge;

based on the authentication challenge, cryptographically generating a challenge response by unblinding the authentication challenge using a token stored by the user device, wherein the token is a one-time token obtained from an issuer that represents a previously made attestation to permit the user device to have sustained access to the network resource; and sending the challenge response, via the secure authentication protocol, to the identity provider.

22. The method of claim 21, wherein the token is a one-time token obtained from an issuer to permit the user device to have sustained access to the network resource.

23. The method of claim 22, further comprising storing a profile on the user device, wherein the profile includes an identifier according to a trusted authentication federation and an anonymous identity with an identity provider realm.

24. The method of claim 22, further comprising:

determining that the user device has no valid one-time tokens stored to enable the user device to have sustained access to the network resource, wherein generating the challenge response is performed based on a remediation token stored on the user device that allows the user device to temporarily access the network resource and perform remediation by which the user device attempts to obtain one or more new one-time tokens that permit the user device to have sustained access to the network resource.

25. The method of claim 24, further comprising:

receiving an access accept message that includes information indicating a period of time that the user device is allowed to access the network resource for remediation.

26. A method comprising:

sending, from a user device to an identity provider, a request to obtain access to a network resource, the request being sent as part of a secure authentication protocol via an access point that is in communication with the user device;

receiving, via the secure authentication protocol from the identity provider, an authentication challenge;

determining that the user device has no valid tokens stored to enable the user device to have access to the network resource;

based on the authentication challenge, generating a challenge response that includes an attestation request to be forwarded to an attester to enable the attester to obtain one or more new tokens for the user device if the attester attests a user device identity and a user identity of a user associated with the user device, wherein the attestation request is generated in response to determining that the user device has no valid tokens stored and initiates a token issuance process for remediation; and sending the challenge response to the identity provider.

27. The method of claim 26, further comprising:

receiving from the identity provider a message that includes the one or more new tokens.

28. The method of claim 27, further comprising:

after receiving the message that includes the one or more new tokens, generating a challenge response based on one of the one or more new tokens; and sending the challenge response based on one of the one or more new tokens to the identity provider.

29. The method of claim 28, wherein the secure authentication protocol is an Extensible Authentication Protocol-Flexible Authentication via Secure Tunneling (EAP-FAST) protocol or a Tunnel Extensible Authentication Protocol (TEAP) authentication.

30. The method of claim 29, wherein the request is sent as part of a first phase of the EAP-FAST protocol authentication or a first phase of the TEAP authentication.

31. The method of claim 30, wherein receiving the authentication challenge comprises receiving an EAP token card challenge as part of a second phase of the EAP-FAST protocol authentication or a second phase of the TEAP authentication, and wherein the challenge response is sent as part of the second phase of the EAP-FAST protocol authentication or the second phase of the TEAP authentication.

32. The method of claim 31, wherein the message that includes the one or more tokens is received as an intermediate result as part of the second phase of the EAP-FAST protocol authentication or the second phase of the TEAP authentication.

* * * * *